(12) United States Patent
Okazaki et al.

(10) Patent No.: US 10,833,549 B2
(45) Date of Patent: Nov. 10, 2020

(54) ROTARY ELECTRIC MACHINE

(71) Applicant: MITSUBISHI ELECTRIC CORPORATION, Chiyoda-ku (JP)

(72) Inventors: Kodai Okazaki, Chiyoda-ku (JP); Masatsugu Nakano, Chiyoda-ku (JP); Kazumasa Ito, Chiyoda-ku (JP); Yu Hirotani, Chiyoda-ku (JP); Hiroko Ikeda, Chiyoda-ku (JP); Koji Kawamura, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 334 days.

(21) Appl. No.: 15/759,845

(22) PCT Filed: Feb. 26, 2016

(86) PCT No.: PCT/JP2016/055896
§ 371 (c)(1),
(2) Date: Mar. 14, 2018

(87) PCT Pub. No.: WO2017/073092
PCT Pub. Date: May 4, 2017

(65) Prior Publication Data
US 2018/0248433 A1    Aug. 30, 2018

(30) Foreign Application Priority Data

Oct. 28, 2015   (JP) .................................. 2015-211874

(51) Int. Cl.
*H02K 3/04*    (2006.01)
*H02K 3/28*    (2006.01)
(Continued)

(52) U.S. Cl.
CPC ............. *H02K 3/28* (2013.01); *B62D 5/0424* (2013.01); *H02K 1/146* (2013.01); *H02K 3/18* (2013.01); *H02K 21/16* (2013.01)

(58) Field of Classification Search
CPC .. H02K 3/00; H02K 3/04; H02K 3/18; H02K 3/28
See application file for complete search history.

(56) References Cited

U.S. PATENT DOCUMENTS 2,711,008 A * 6/1955 Smith ....................... H02K 1/16
                                                        29/596
4,403,401 A * 9/1983 Rosenberry .............. H02K 1/16
                                                        29/596
(Continued)

FOREIGN PATENT DOCUMENTS

DE    10 2011 078 157 A1    1/2013
EP       2 107 666 A2     10/2009
(Continued)

OTHER PUBLICATIONS

Office Action dated Feb. 13, 2020 in Indian Patent Application No. 201847013146, 6 pages.
(Continued)

*Primary Examiner* — Dang D Le
(74) *Attorney, Agent, or Firm* — Xsensus LLP

(57) ABSTRACT

In the armature winding of a rotary electric machine, in a series coil portion group, the numbers of turns of conducting wire in the coil portions that have an electrical angular phase difference of $\theta_k$ that satisfies $\theta_1 < \theta_k \theta_m$ are different than the numbers of turns of conducting wire in the $\theta_1$ and $\theta_m$ coil portions, and are also different than the numbers of turns of conducting wire in the coil portions that are adjacent to the $\theta_k$ coil portions on two sides in a circumferential direction of the stator core, and phases of the $\theta_k$ coil portions are also (Continued)

different than phases of each of the coil portions that are adjacent to the $\theta_k$ coil portions on the two sides in the circumferential direction.

13 Claims, 38 Drawing Sheets

(51) Int. Cl.
   *H02K 21/16* (2006.01)
   *H02K 3/18* (2006.01)
   *B62D 5/04* (2006.01)
   *H02K 1/14* (2006.01)

(56) References Cited

U.S. PATENT DOCUMENTS

| | | |
|---|---|---|
| 2009/0251023 A1 | 10/2009 | Nakano et al. |
| 2014/0084728 A1 | 3/2014 | Iwasaki et al. |
| 2014/0346910 A1* | 11/2014 | Nakano ................ B62D 5/0463 310/156.01 |
| 2015/0010412 A1 | 1/2015 | Liu et al. |
| 2016/0156240 A1* | 6/2016 | Shimozu ................. H02K 3/34 310/208 |

FOREIGN PATENT DOCUMENTS

| | | |
|---|---|---|
| EP | 2 107 666 A3 | 10/2009 |
| EP | 2 767 611 A1 | 10/2014 |
| JP | 2000-253602 A | 9/2000 |
| JP | 2009-213257 A | 9/2009 |
| JP | 2014-068497 A | 4/2014 |
| JP | 2014-158396 A | 8/2014 |

OTHER PUBLICATIONS

Extended European Search Report dated Oct. 18, 2018 in Patent Application No. 16859329.1, 9 pages.
International Search Report dated May 24, 2016 in PCT/JP2016/055896, filed on Feb. 26, 2016.

* cited by examiner

FIG. 33

| (a) NUMBER OF TURNS IN TEETH A COIL PORTIONS | 16 | 15 | 14 | 13 | 12 | 11 | 10 | 9 | 8 |
|---|---|---|---|---|---|---|---|---|---|
| (b) NUMBER OF TURNS IN TEETH B COIL PORTIONS | 4 | 6 | 8 | 10 | 12 | 14 | 16 | 18 | 20 |
| TURN RATIO ((b)/(a)) | 0.25 | 0.40 | 0.57 | 0.77 | 1.00 | 1.27 | 1.60 | 2.00 | 2.50 |

ROTARY ELECTRIC MACHINE

TECHNICAL FIELD

The present invention relates to a construction of a rotary electric machine, and relates to a rotary electric machine that is used in an automotive electric power steering apparatus, for example.

BACKGROUND ART

Conventionally, in electric motors in which a three-phase electric current is supplied from an inverter to an armature winding that includes coil portions in which conducting wires are wound so as to be housed in plurality of slots that are formed on a stator core so as to be concentrated on a plurality of teeth, electric motors are known in which space factor of the coil portions in the slots is improved by making the number of turns of the conducting wires in the coil portions on adjacent teeth different (see Patent Literature 1 and Patent Literature 2, for example).

In Patent Literature 1 above and Patent Literature 2 above, a rotary electric machine that is characterized in that the number of field poles in the rotor is 12n±2n and the number of slots is 12n, where n is a natural number, and an electric motor that is characterized in that the number of field poles in the rotor is 18n±2n and the number of slots is 18n, where n is a natural number, are disclosed, and these aim for vibration and noise reductions in the electric motors.

CITATION LIST

Patent Literature

Patent Literature 1: Japanese Patent Laid-Open No. 2014-68497 (Gazette)
Patent Literature 2: Japanese Patent Laid-Open No. 2009-213257 (Gazette)

SUMMARY OF THE INVENTION

Problem to be Solved by the Invention

However, as described in Patent Literature 1 above and Patent Literature 2 above, in an electric motor that is characterized in that the number of field poles in the rotor is 12n±2n and the number of slots is 12n, where n is a natural number, and an electric motor that is characterized in that the number of field poles in the electric motor is 18n±2n and the number of slots is 18n, where n is a natural number, the constructions are such that coil portions that have identical phase are adjacent in at least one position in a circumferential direction.

As a result thereof, coil portions that are adjacent to coil portions that have a large number of turns of conducting wire, i.e., overwound coil portions, have identical phase, and heat generation is concentrated locally.

In electric motors that are used in automotive electric power steering apparatuses, for example, battery voltage is low, at approximately 12 V generally, and since it is necessary to increase electric current in order to increase output, coil portions are formed that have a lower number of turns using conducting wire that has a larger diameter.

Here, one problem has been that localized heat generation is increased between coil portions that have identical phase where the coil portions that have identical phase are adjacent if the steering wheel position is kept in a constant position and the three-phase electric current is fixed without fluctuating during steering wheel operation under electric power steering, for example.

The present invention aims to solve the above problems and an object of the present invention is to provide a rotary electric machine that can suppress increases in localized heat generation if the number of turns or wire diameter of conducting wires of some coil portions are changed.

Means for Solving the Problem

A rotary electric machine according to the present invention includes:
a stator including:
a stator core in which a plurality of slots are formed by a plurality of teeth that extend radially inward from an annular core back so as to leave a spacing in a circumferential direction; and
an armature winding that includes a plurality of coil portions that are mounted to the teeth of the stator core; and
a rotor that is disposed inside the stator so as to have a magnetic air gap portion interposed, and that rotates around a rotating shaft,
wherein:
the number of identical-phase coil portions among the coil portions in the armature winding is n, where n≥3, and in a series coil portion group that includes in of the coil portions that are serially connected, where m≤n), where a largest electrical angular phase difference between two of the coil portions is $\theta_m$, an electrical angular phase difference of a first of the coil portions that have the largest electrical angle phase difference is $\theta_1=0°$, and respective electrical angular phase differences of remaining coil portions relative to the coil portion that has an electrical angular phase difference of $\theta_1$ are $\theta_2$, $\theta_3$, etc., through $\theta_m$ in increasing order:
the numbers of turns of conducting wire in the coil portions that have an electrical angular phase difference of $\theta_k$ that satisfies $\theta_1<\theta_k<\theta_m$, where k=2, 3, etc., through m−1, are different than the numbers of turns of conducting wire in the coil portions that have electrical angular phase differences of $\theta_1$ and $\theta_m$, and are also different than the numbers of turns of conducting wire in the coil portions that are adjacent to the coil portions that have the electrical angular phase differences of $\theta_k$ on two sides in a circumferential direction of the stator core, and phases of the coil portions that have the electrical angular phase differences of $\theta_k$ are also different than phases of each of the coil portions that are adjacent to the coil portions that have the electrical angular phase differences of Ok on the two sides in the circumferential direction; or
wire diameters of conducting wire in the coil portions that have the electrical angular phase difference of $\theta_k$ that satisfies $\theta_1<\theta_1<\theta_k<\theta_m$, where k=2, 3, etc., through m−1, are different than wire diameters of conducting wire in the coil portions that have electrical angular phase differences of $\theta_1$ and $\theta_m$, and are also different than wire diameters of conducting wire in the coil portions that are adjacent to the coil portions that have the electrical angular phase differences of $\theta_k$ on two sides in a circumferential direction of the stator core, and phases of the coil portions that have the electrical angular phase differences of $\theta_k$ are also different than phases of each of the coil portions that are adjacent to the coil portions that have the electrical angular phase differences of $\theta_k$ on the two sides in the circumferential direction.

Effects OF THE Invention

According to the rotary electric machine according to the present invention, increases in localized heat generation in specific coil portions can be suppressed if the number of turns or wire diameter of conducting wires of some coil portions are changed.

BRIEF DESCRIPTION OF THE DRAWINGS

FIG. 33 is a table that shows turn ratios when the number of turns in the electric motor according to Embodiment 1 is varied;

DESCRIPTION OF EMBODIMENTS

Respective embodiments of the electric motor according to the present invention will now be explained with reference to the drawings, and identical or corresponding members and portions in each of the figures will be explained using identical numbering.

Embodiment 1

Figure 1:
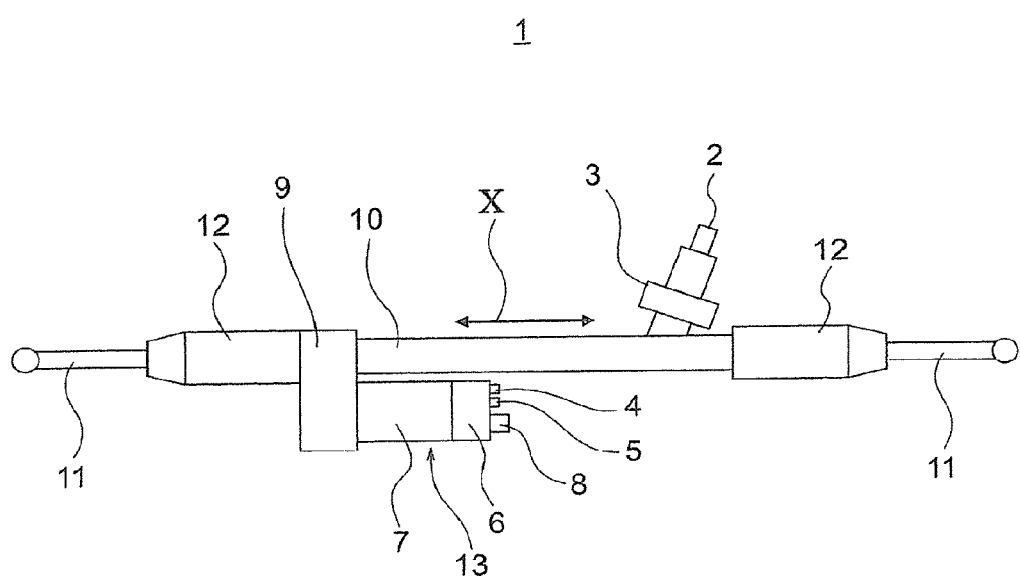
FIG. 1 is a configuration diagram that shows an automotive electric power steering apparatus to which an electric motor according to Embodiment 1 of the present invention is mounted.
Figure 2:
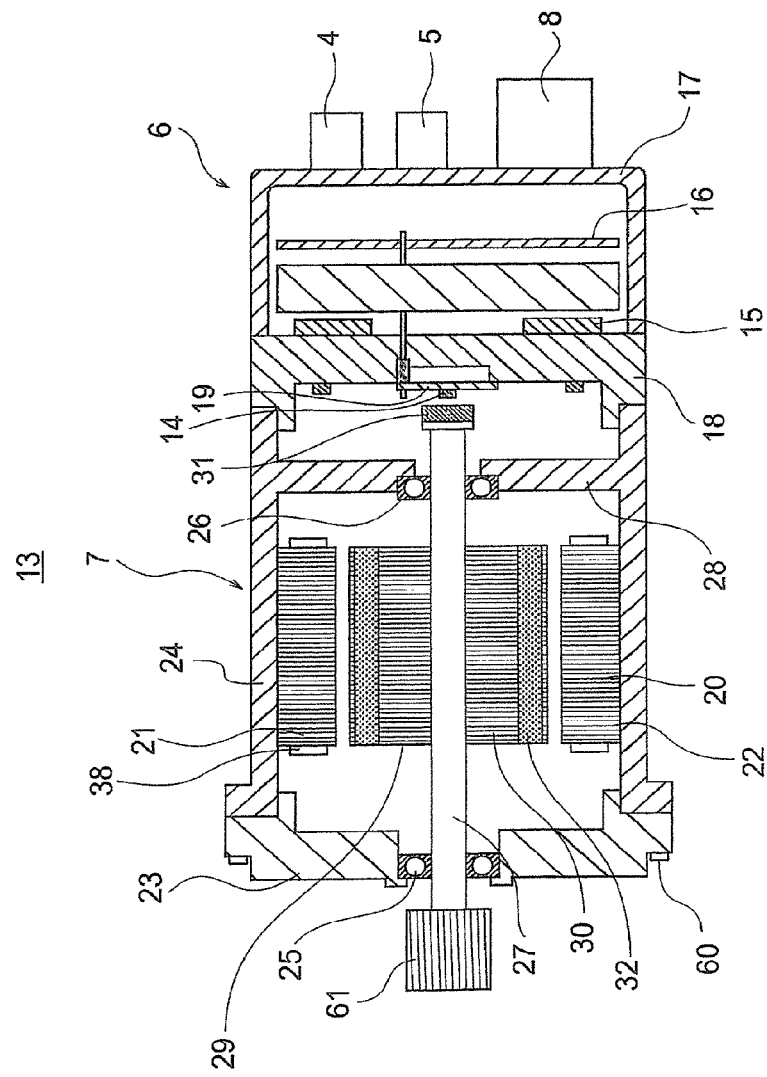
FIG. 2 is a cross section that shows an electric driving apparatus from FIG. 1.

FIG. 1 is a configuration diagram that shows an automobile electric power steering apparatus 1 to which an electric motor 7 according to Embodiment 1 of the present invention is mounted, and FIG. 2 is a cross section that shows an electric driving apparatus 13 from FIG. 1.

This electric power steering apparatus includes: an electric motor 7 that constitutes a rotary electric machine; and an electric driving apparatus 13 that is constituted by an electronic control unit (ECU) 6 that is integrated with the electric motor 7.

Moreover, in the above electric driving apparatus 13, the electric motor 7 and the ECU 6 are integrated so as to be disposed in an axial direction of the electric motor 7, but are not limited thereto, and the ECU 6 may be disposed in a radial direction of the electric motor 7, or the electric motor 7 and the ECU 6 may be separate.

In this electric power steering apparatus 1, a driver steers a steering wheel (not shown), and torque therefrom is transmitted to a shaft 2 by means of a steering column (not shown). Here, torque that is detected by a torque sensor 3 is converted into electrical signals, which are transmitted through cables (not shown) to the ECU 6 by means of a first connector 4.

At the same time, vehicle information such as vehicle speed is converted to electrical signals, which are transmitted to the ECU 6 through a second connector 5. The ECU 6 computes the required assisting torque from the above torque and the vehicle information such as the vehicle speed, and supplies electric current through an inverter to the electric motor 7 that is arranged so as to be parallel to a housing 10.

Electric power supply to the ECU 6 is fed by means of an electric power supply connector 8 from a battery or an alternator.

Torque that is generated by the electric motor 7 is made to generate thrust that moves the rack shaft (not shown) inside the housing 10 in the direction of the arrows X to assist the steering force of the driver by means of a gear box 9 into which belts (not shown) and ball screws (not shown) are mounted internally.

Tie rods 11 thereby move, enabling the tires to be steered and the vehicle turned.

As a result, the driver is assisted by the torque of the electric motor 7, and can turn the vehicle using a reduced steering force.

Moreover, a rack boot 12 is disposed so as to prevent foreign matter from entering the apparatus.

The electric motor 7 includes: a stator 22; a cylindrical frame 24, the stator 22 being fixed to an inner wall surface of the cylindrical frame 24; a housing 23 that is fixed by a plurality of bolts 60 so as to cover an opening portion at one end of the frame 24; and a rotor 29 that is rotatably disposed inside the stator 22.

The stator 22 has: a stator core 20 that is configured by laminating core sheets of a magnetic body such as electromagnetic steel sheets, etc.; and an armature winding 38 that is housed in this stator core 20.

The rotor 29 has; a shaft 27 that constitutes a rotating shaft, two end portions thereof being supported by a first bearing 25 that is fitted into the housing 23 and a second bearing 26 that is fitted into a wall portion 28; a rotor core 30 through which the shaft 27 passes; fourteen permanent magnets 32 that are embedded and glued inside this rotor core 30 at a uniform spacing circumferentially; a pulley 61 that is fixed to a first end portion of the shaft 27; and a sensor permanent magnet 31 that is fixed to a second end portion of the shaft 27 so as to face a magnetic sensor 14 that constitutes a rotational angle sensor that is disposed on a circuit board 19.

Figure 3:
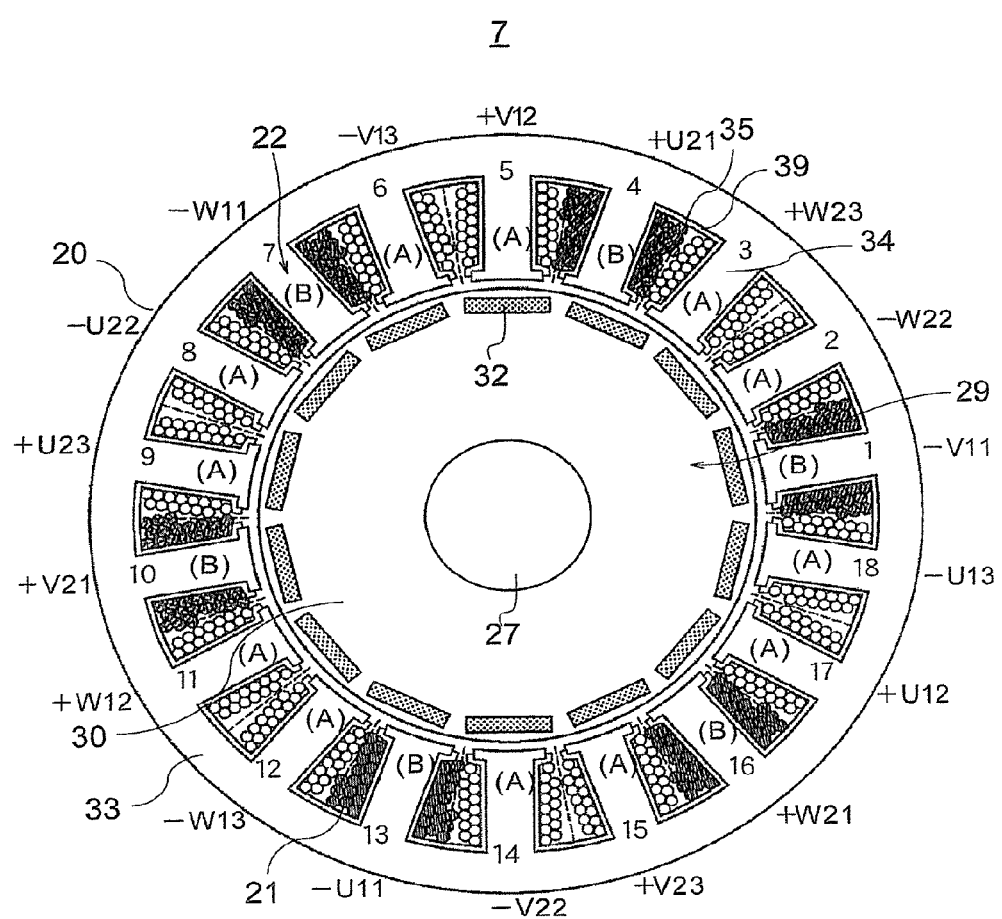
FIG. 3 is a frontal cross section that shows the electric motor from FIG. 2.

FIG. 3 is a frontal cross section that shows the electric motor 7 from FIG. 2.

The stator core 20 of the stator 22 has: an annular core back 33; and eighteen teeth 34 that extend radially inward from the core back 33, which is a magnetic air gap length direction, slots 35 being formed between adjacent teeth 34.

The armature winding 38 of the stator 22 is constituted by a plurality of coil portions in which conducting wires 21 are respectively wound into concentrated windings on the eighteen teeth 34 so as to have insulators 39 interposed, and that are accommodated in the slots 35.

The respective coil portions are mounted to each of the teeth 34, to which the numbers 1, 2, 3, etc., through 18 are allotted counterclockwise, and are connected to U-phase, V-phase, and W-phase electric power supplies.

There are six coil portions that are included in the V phase, i.e., −V11, +V12, −V13, +V21, −V22, and +V23, six coil portions that are included in the W phase, i.e., −W11, +W12, −W13, +W21, −W22, and +W23, and six coil portions that are included in the U phase, i.e., −U11, +U12, −U13, +U21, −U22, and +U23, which are each connected externally.

As shown in FIG. 3, the respective coil portions correspond to the respective Numbers 1 through 18 of the teeth 34, and are disposed so as to line up in order of −V11, −W22, +W23, +U21, +V12, −V13, −W11, −U22, +U23, +V21, +W12, −W13, −U11, −V22, +V23, +W21, +U12, and −U13. Moreover, "+" and "−" indicate winding polarities of the coil portions, "+" and "−" having opposite winding polarities.

Figure 4:
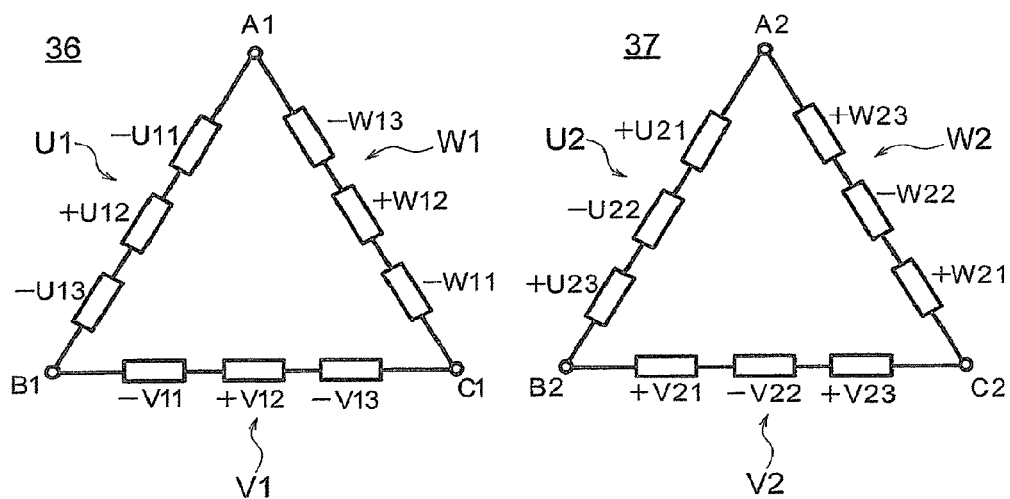
FIG. 4 is a connection diagram for the electric motor in FIG. 3 when an armature winding is delta-connected.

FIG. 4 is an explanatory diagram for connection of the armature winding 38, the armature winding 38 being constituted by a first armature winding portion 36 and a second armature winding portion 37.

In the first armature winding portion 36, the respective coils portions −U11, +U12, and −U13 are connected in series, the respective coil portions −V11, +V12, and −V13 are connected in series, −W11, +W12, and −W13 are connected in series, and connecting portions A1, B1, and C1 of respective first identical-phase winding portions of these are connected to constitute a delta connection.

In the second armature winding portion 37, the respective coil portions −U21, +U22, and −U23 are connected in series, the respective coil portions −V21, +V22, and −V23 are connected in series, −W21, +W22, and −W23 are connected in series, and connecting portions A2, B2, and C2 of respective second identical-phase winding portions of these are connected to constitute a delta connection.

Figure 5:
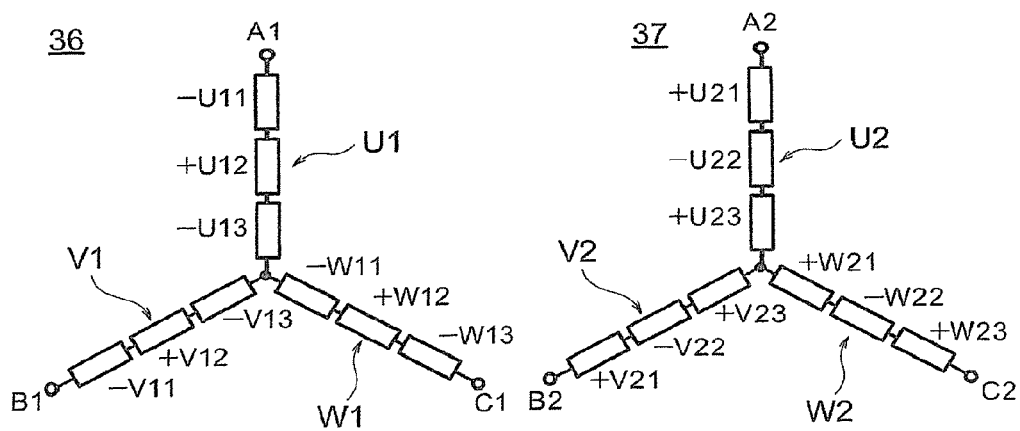
FIG. 5 is a connection diagram for the electric motor in FIG. 3 when the armature winding is wye-connected.

Moreover, the armature winding 38, in which the number of parallel arms in each phase is two, may be configured by wye-connecting the first armature winding portion 36 and the second armature winding portion 37, as shown in FIG. 5.

Moreover, hereafter a plurality of coil portions that have identical phase that are connected in series will be called a "series coil portion group".

Figure 6:
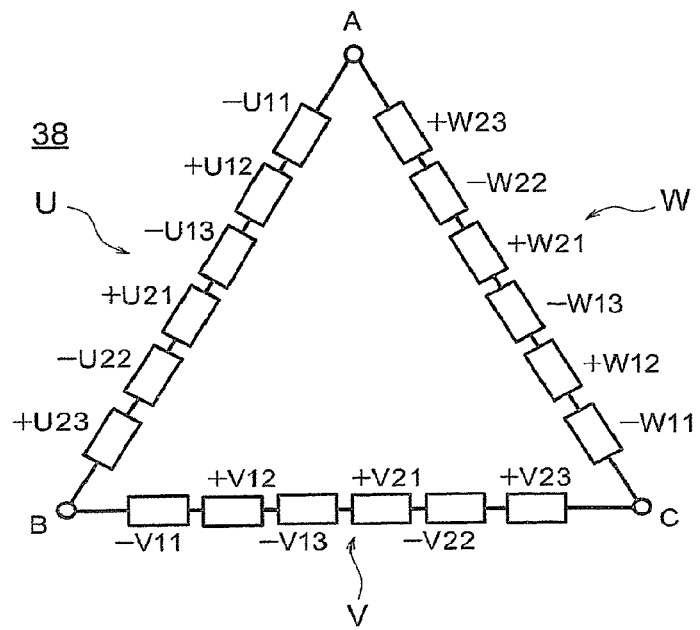
FIG. 6 is a connection diagram that shows a variation of FIG. 4.

Alternatively, as shown in FIG. 6, the armature winding 38 may be configured into a single set of three-phase delta connections by connecting A, B, and C, which are connecting portions at two end portions of the series coil portion groups of each phase, in which all of the respective coil portions that have identical phase are connected in series.

Figure 7:
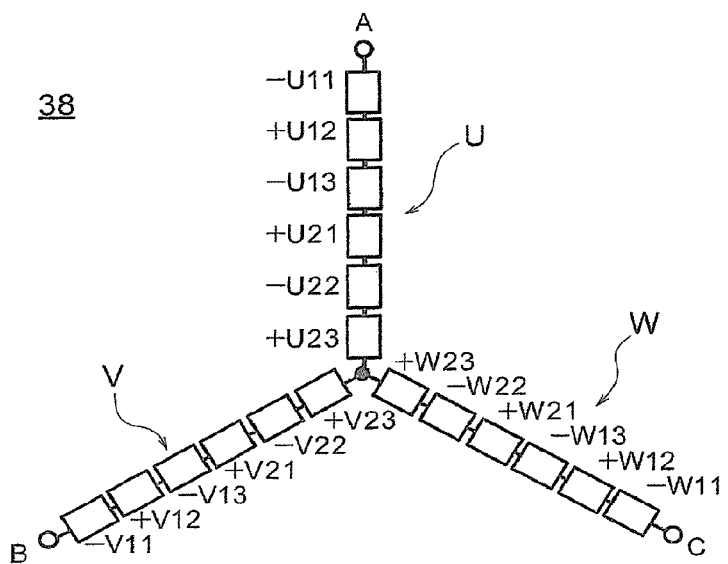
FIG. 7 is a connection diagram that shows a variation of FIG. 5.

Alternatively, as shown in FIG. 7, the armature winding 38 may be configured into a single set of three-phase wye connections by connecting A, B, and C, which are connecting portions at two end portions of the series coil portion groups of each phase, in which all of the respective coil portions that have identical phase are connected in series.

In FIG. 3, cross sections of the conducting wires 21 that constitute the coil portions in each of the slots 35 are shown. In this figure, the number of conducting wires 21 that are adjacent to the first and second side walls that extend in a radial direction of each of the teeth 34 represents the number of turns of the conducting wires 21 in the each of the coil portions.

In this figure, if Numbers 2, 3, 5, 6, 8, 9, 11, 12, 14, 15, 17, and 18 of the teeth 34 are collectively called teeth A, and Numbers 1, 4, 7, 10, 13, and 16 of the teeth 34 are collectively called teeth B, then the number of turns and the wire diameter of the conducting wires 21 of the coil portions that are mounted to the teeth B are greater in number and larger than the number of turns and the wire diameter of the conducting wires 21 of the coil portions that are mounted to the teeth A.

Moreover, in this figure, hatching has been added to indicate the cross sections of the coil portions that are mounted to the teeth B.

Moreover, configuration of the rotor 29 and construction of the stator 22 may be different to those of FIG. 3 provided that the electric motor 7 has fourteen field poles in the rotor 29, and the number of slots 35 and the number of teeth 34 in the stator 22 is eighteen.

Figure 8:
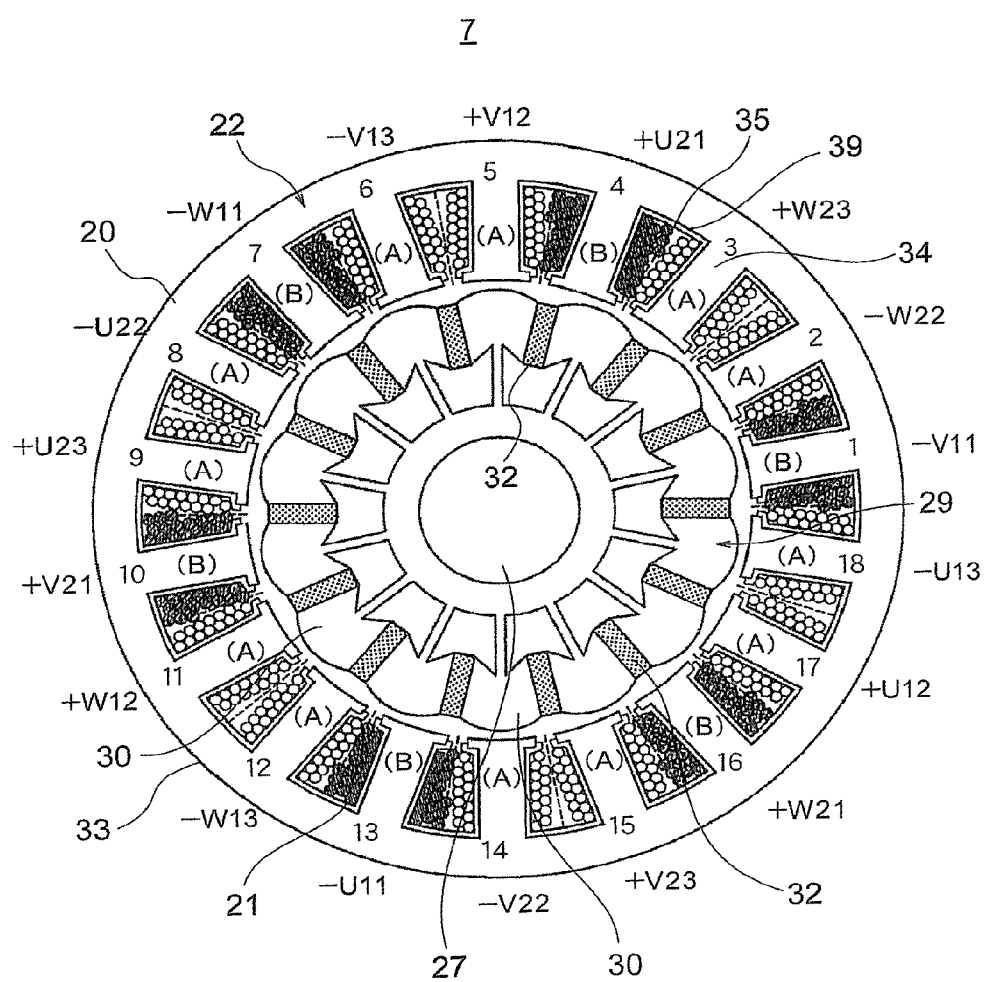
FIG. 8 is a frontal cross section that shows a variation of the electric motor according to Embodiment 1.

FIG. 8 is a frontal cross section cross section that shows a variation of the electric motor 7 according to Embodiment 1, and in this electric motor 7, fourteen permanent magnets 32 are embedded in a rotor core 30 so as to have shapes in which a radial length of the fourteen permanent magnets 32 is longer than a circumferential length, and facing surfaces of adjacent permanent magnets 32 are magnetized so as to be mutually identical poles.

Figure 9:
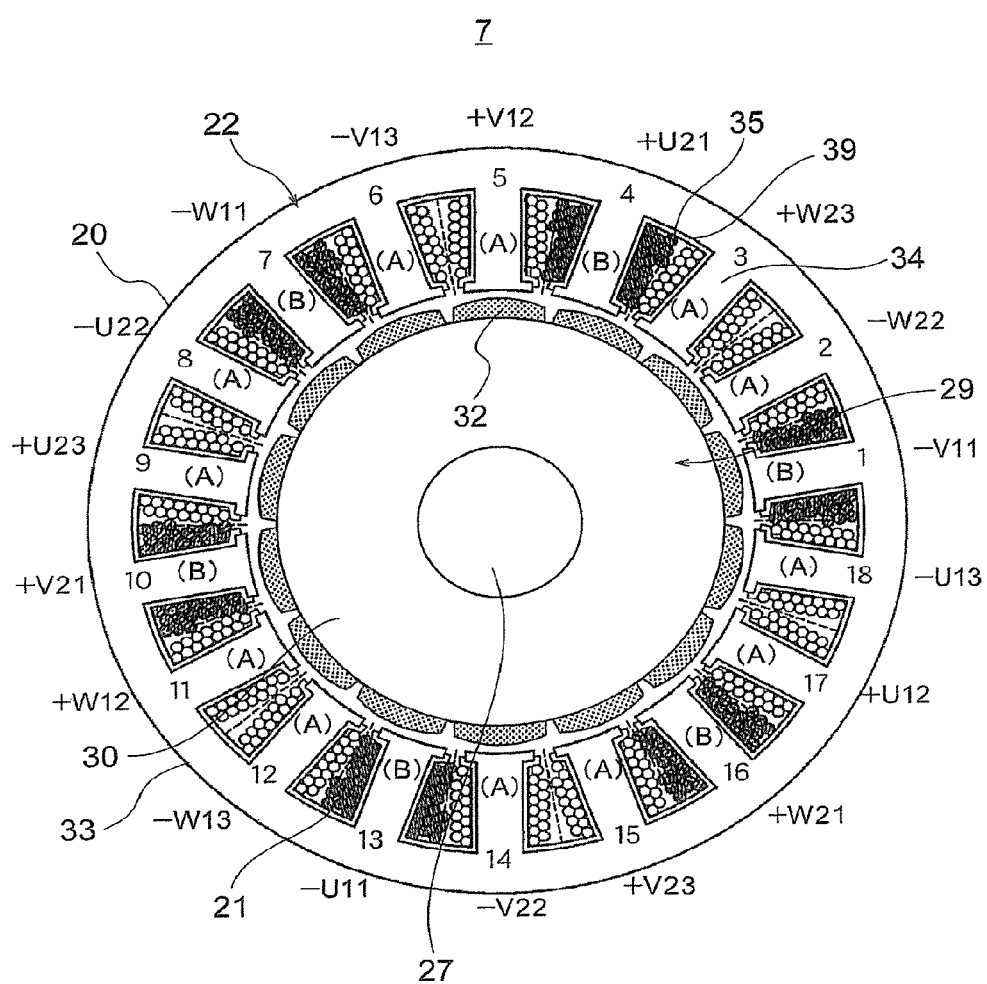
FIG. 9 is a frontal cross section that shows another variation of the electric motor according to Embodiment 1.

FIG. 9 is a frontal cross section that shows another variation of the electric motor 7 according to Embodiment 1, and in this electric motor 7, fourteen permanent magnets 32 are affixed around an outer circumference of the rotor core 30 at a uniform pitch in a circumferential direction.

Moreover, in this example, an outer side of the permanent magnets 32 may be covered by a cover in which a nonmagnetic material such as a stainless alloy or aluminum is made into a cylindrical shape to protect and prevent scattering of the permanent magnets 32.

Figure 10:
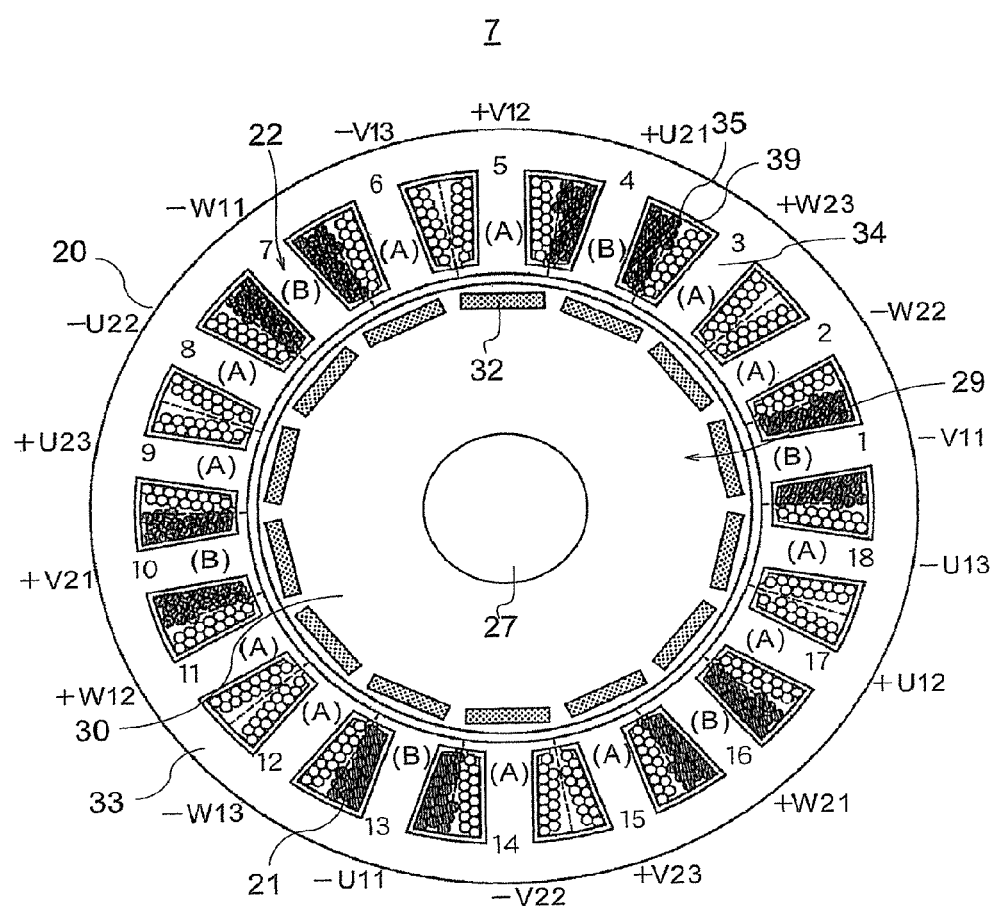
FIG. 10 is a frontal cross section that shows yet another variation of the electric motor according to Embodiment 1.

In addition, FIG. 10 is a frontal cross section that shows yet another variation of the electric motor 7 according to Embodiment 1, and in this electric motor 7, tip portions of each of the teeth 34 of the stator 22 are placed in contact at end surfaces in a circumferential direction.

Figure 11:
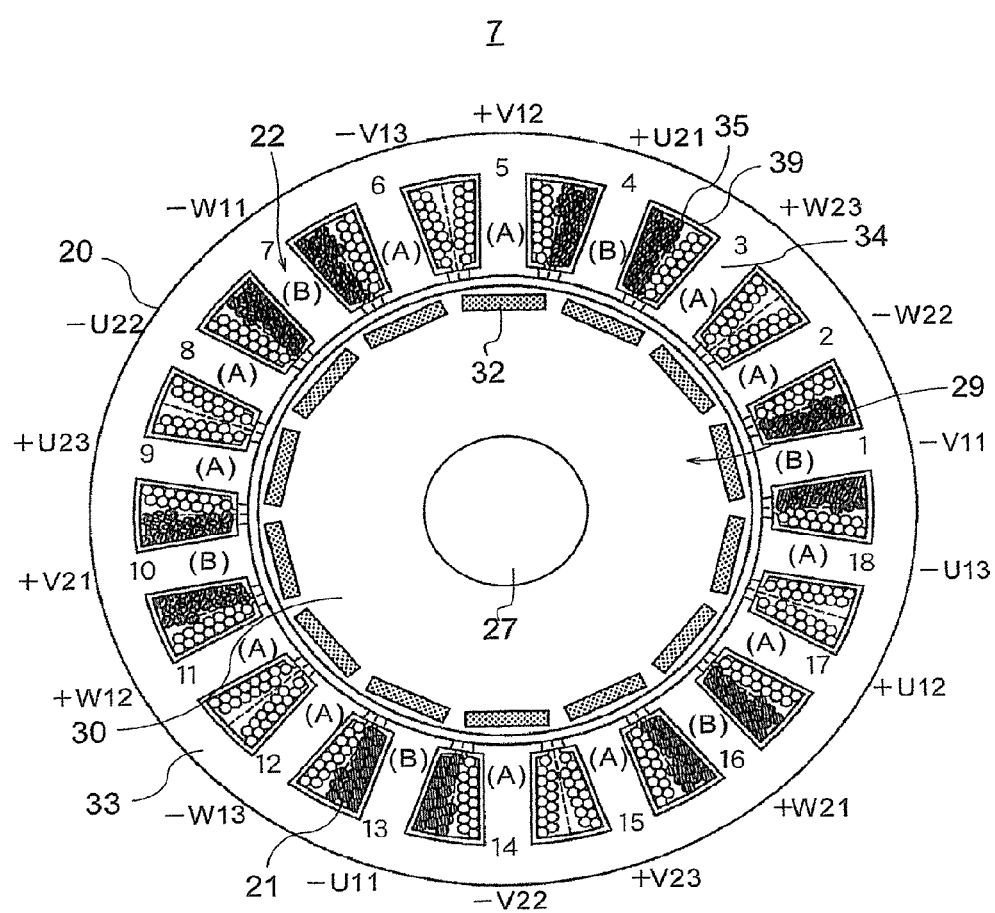
FIG. 11 is a frontal cross section that shows yet another variation of the electric motor according to Embodiment 1.
Figure 12:
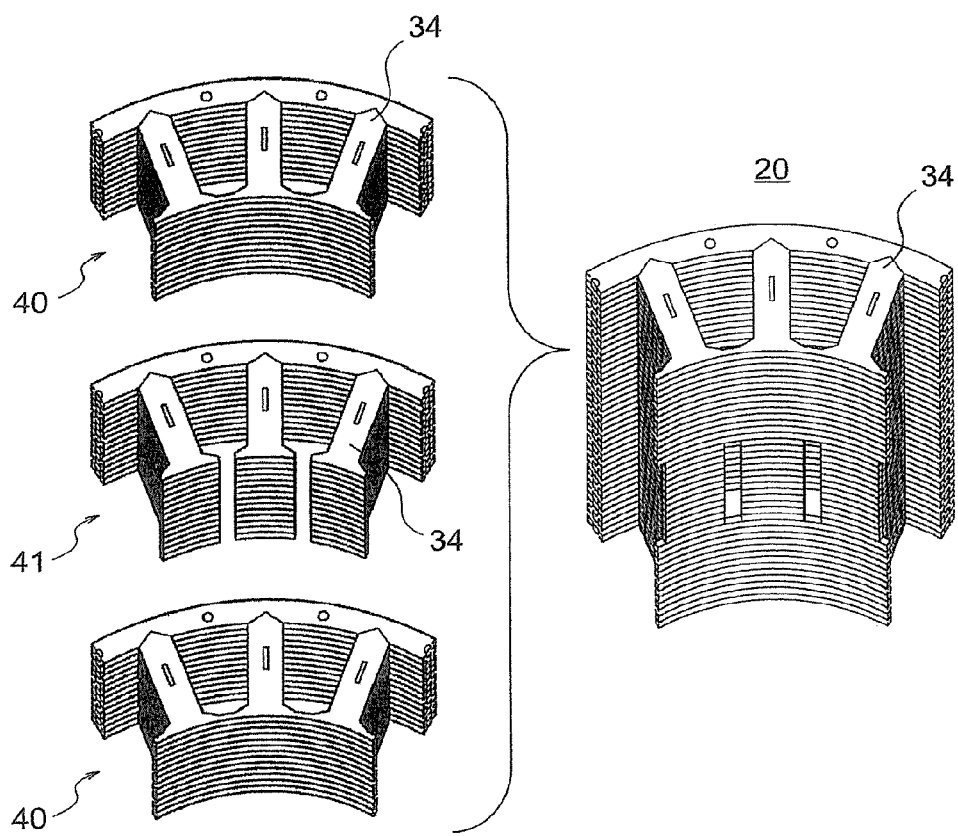
FIG. 12 is a partial oblique projection of a stator core from FIG. 11.

In addition, FIG. 11 is a frontal cross section that shows yet another variation of the electric motor 7 according to Embodiment 1, and in this electric motor 7, as can be seen from FIG. 12, which shows a portion of the stator core 20 that is ⅙ of a circumference, the stator core 20 is constituted by: open core blocks 41 that have openings at tip portions near the rotor 29 between pairs of adjacent teeth 34; and linked core blocks 40 that are disposed on upper and lower portions of these open core blocks 41, and in which tip portions near the rotor 29 between pairs of adjacent teeth 34 are linked to each other.

Moreover, the linked core blocks 40 include those in which two end surfaces at the tip portions near the rotor 29 between the adjacent teeth 34 are placed in contact with each other.

Figure 13:
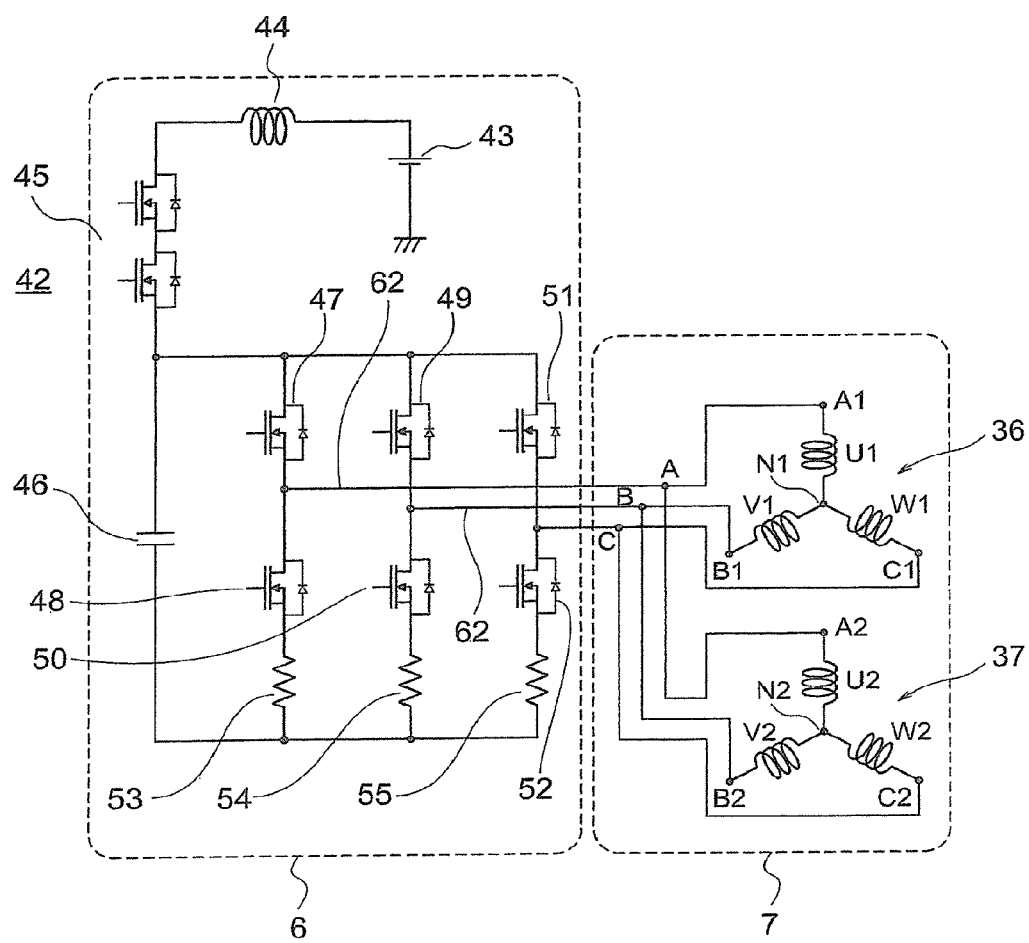
FIG. 13 is a circuit diagram that shows an inverter from FIG. 1.

FIG. 13 is a circuit diagram for the electric motor 7 and the ECU 6.

Details are omitted in the electric motor 7, and only the armature winding is shown.

Details of the ECU 6 are also omitted for simplicity, and only the power circuit portion of the inverter 42 is shown.

The ECU 6 is constituted by a circuit of a single inverter 42, and three-phase electric current is supplied to the armature winding 38 from this inverter 42.

In the armature winding 38, the connecting portions A1 and A2, the connecting portions B1 and B2, and the connecting portions C1 and C2 are respectively connected by connecting portions A, B, and C at the connecting portions A1, B1, and C1 of the wye-connected first armature winding portion 36 and the connecting portions A2, B2, and C2 of the wye-connected second armature winding portion 37 that are shown in FIG. 5 to configure a circuit in which two arms of each phase are connected in parallel.

Moreover, with regard to the armature winding 38 that is connected to the inverter 42, the first armature winding portion 36 and the second armature winding portion 37 that are shown in FIG. 4, which are delta-connected, may alternatively be used.

The armature windings 38 that are shown in FIGS. 6 and 7, in which the coil portions are each connected in series, are also possible.

A direct-current power source is supplied to the ECU 6 from a power source 43 such as a battery, being connected to an electric power supply relay 45 so as to have a noise reduction coil 44 interposed.

Moreover, in FIG. 13, the power source 43 is depicted as if it were inside the ECU 6, but in fact electric power is supplied from an external power source such as a battery through a connector.

One electric power supply relay 45 that is constituted by two MOSFETs is disposed, and operates such that the electric power supply relay 45 opens during failure, to prevent excessive electric current from flowing.

In this figure, connection is made sequentially in order of the power supply 43, the coil 44, and the electric power supply relay 45, but it goes without saying that the electric power supply relay 45 may be disposed at a position that is closer to the power supply 43 than the coil 44.

Moreover, a capacitor 46 is a smoothing capacitor.

In this figure, this is constituted by a single capacitor 46, but it goes without saying that it may be configured by connecting a plurality of capacitors in parallel.

The inverter 42 is constituted by a bridge that uses six MOSFETs, a first MOSFET 47 and a second MOSFET 48 being connected in series, a third MOSFET 49 and a fourth MOSFET 50 being connected in series, a fifth MOSFET 51 and a sixth MOSFET 52 being connected in series, and these three sets of MOSFETs being further connected in parallel. In addition, a first shunt 53, a second shunt 54, and a third shunt 55 that are used in the detection of electric current values are respectively connected to a ground (GND) side of each of the three lower MOSFETs, i.e., the second MOSFET 48, the fourth MOSFET 50, and the sixth MOSFET 52. Moreover, an example is shown in which there are three shunts 53, 54, and 55, but since electric current detection is possible even if there are two shunts or even if there is a single shunt, it goes without saying that such configurations are also possible.

Supply of electric current to the electric motor 7, as shown in FIG. 13, is respectively supplied from between the first MOSFET 47 and the second MOSFET 48 through a busbar 62 to a first U-phase winding portion U1, which is a series coil portion group of the first armature winding portion 36 of the electric motor 7, and a second U-phase winding portion U2, which is a series coil portion group of the second armature winding portion 37, from between the third MOSFET 49 and the fourth MOSFET 50 through a busbar 62 to a first V-phase winding portion V1, which is a series coil portion group of the first armature winding portion 36 of the electric motor 7, and a second V-phase winding portion V2, which is a series coil portion group of the second armature winding portion 37, and from between the fifth MOSFET 51 and the sixth MOSFET 52 through a busbar 62 to a first W-phase winding portion W1, which is a series coil portion group of the first armature winding portion 36 of the electric motor 7, and a second W-phase winding portion W2, which is a series coil portion group of the second armature winding portion 37.

Electrically connected positions between the electric motor 7 and the ECU 6 are at three positions in total for three phases, but they are connected so as to be divided into the first armature winding portion 36 and the second armature winding portion 37 inside the electric motor 7.

In the cases of the connections in FIGS. 6 and 7, in which all of the coil portions that have identical phase are connected in series, electric current is respectively supplied from between the first MOSFET 47 and the second MOSFET 48 through a busbar 62 to a U-phase winding portion U, which is a series coil portion group of the armature winding 38 of the electric motor 7, from between the third MOSFET 49 and the fourth MOSFET 50 through a busbar 62 to a V-phase winding portion V, which is a series coil portion group of the armature winding 38 of the electric motor 7, and from between the fifth MOSFET 51 and the sixth MOSFET 52 through a busbar 62 to a W-phase winding portion W, which is a series coil portion group of the armature winding 38 of the electric motor 7.

Next, an electric motor that represents a first reference example will be explained based on the drawings as a comparative example for explaining the effects according to this embodiment.

Figure 14:
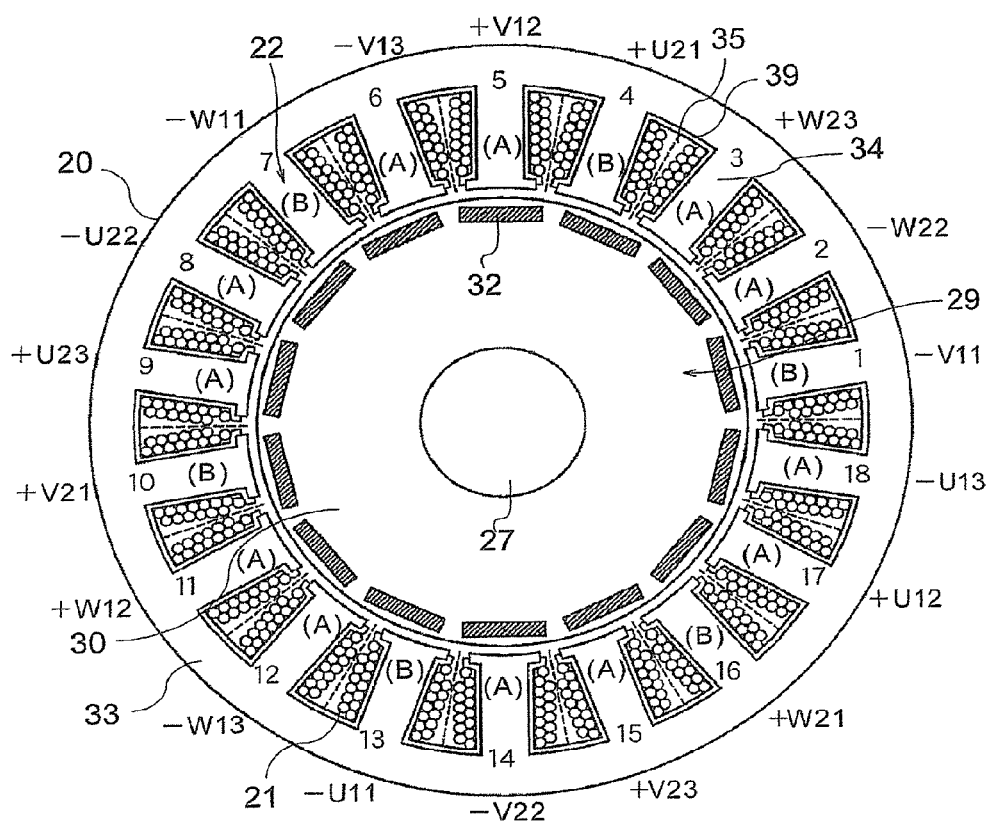
FIG. 14 is a frontal cross section that shows an electric motor of a first reference example.

FIG. 14 is a frontal cross section that shows an electric motor of a first reference example, and the only differences from the electric motor according to Embodiment 1 that is shown in FIG. 3 are that the number of turns and the wire diameters of the conducting wires 21 are different, and construction of the stator 22, i.e., the armature winding 38 and the arrangement of the respective coil portions that constitute components thereof are similar or identical to those of FIG. 3.

Figure 15:
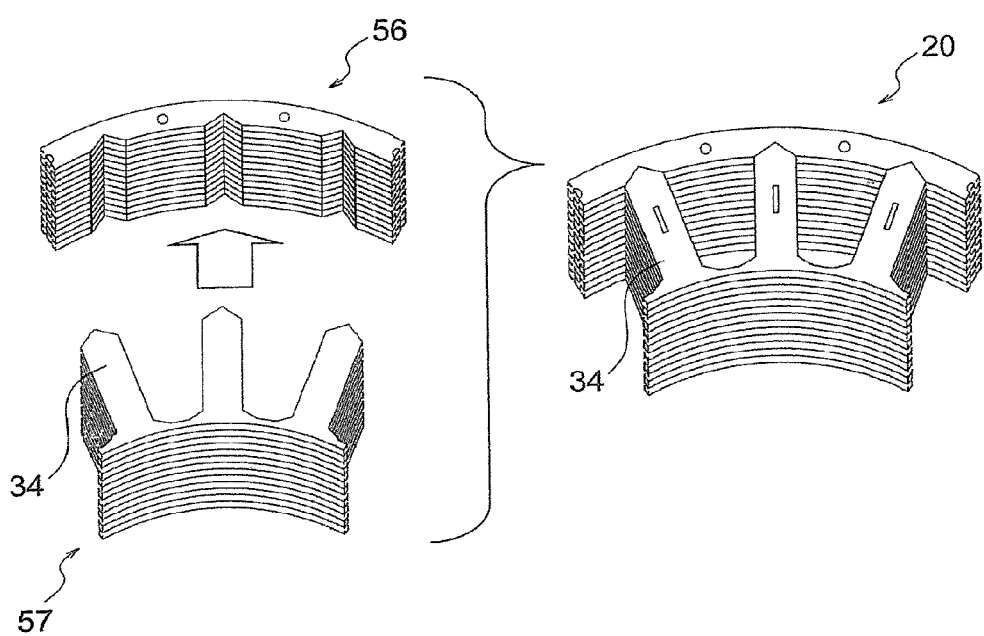
FIG. 15 is a diagram that explains an assembly procedure for the stator core from FIG. 14.

FIG. 15 is a diagram that shows a manufacturing method for the stator core 20 of the electric motor that is shown in FIG. 14.

This stator core 20 is constituted by: an inner core 57 that includes teeth 34 but does not include a core back 33, in which tip portions of adjacent teeth 34 are linked to each other; and an outer core 56 that includes the core back 33 but does not include the teeth 34, and is manufactured by press-fitting the inner core 57 into the outer core 56.

The teeth 34 of the inner core 57 before press-fitting are in a state in which there is no core back 33, and the coil portions can be mounted from radially outside.

Thus, the stator 22 is produced by mounting the coil portions onto the inner core 57 to which insulators 39 have been mounted, and then press-fitting the outer core 56.

In the case of this first reference example, the number of turns of the conducting wires 21 in the respective coil portions on all of the teeth 34 is equal.

In FIG. 14, broken lines are shown inside each of the slots 35 that divide the slots 35 symmetrically in half in the circumferential direction of the stator 22, and the arrangement of the conducting wires 21 of the coil portions inside the slots 35 is symmetrical around the teeth 34 relative to the broken lines shown inside the slots 35.

In configurations such as this first reference example, some problems inside each of the slots 35 have been that gaps increase toward a radially outer side of the stator core 20, space factor that is occupied by the coil portions inside the slots 35 decreases, the ratio of plane cross-sectional area that is occupied by the coil portions relative to the plane cross-sectional area of the slots 35 is reduced, and resistance of the coil portions is increased, increasing the amount of heat generated.

Figure 16:
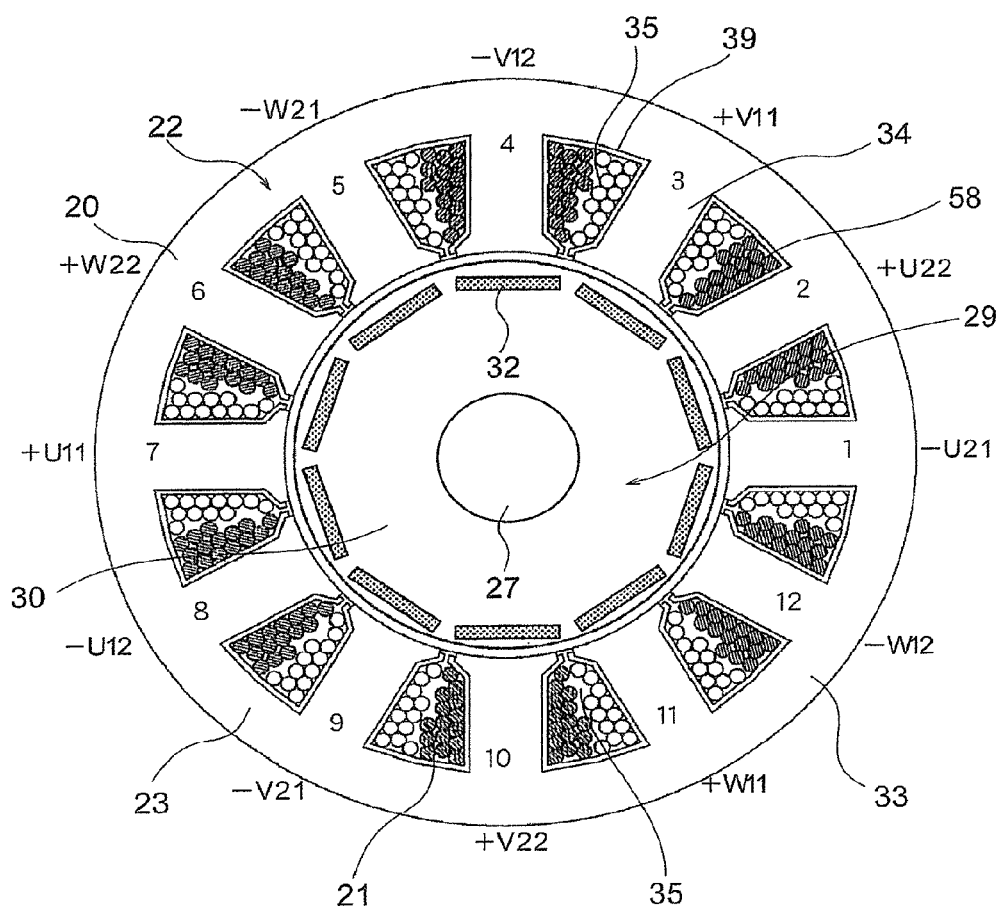
FIG. 16 is a frontal cross section that shows an electric motor of a second reference example.

FIG. 16 is a frontal cross section of an electric motor that shows a second reference example.

This electric motor 7 has ten field poles in a rotor 29, and the number of slots 35 and the number of teeth 34 in a stator 22 is twelve, the rotatable rotor 29 being disposed inside the stator 22.

A shaft 27 that constitutes a rotating shaft is disposed in the rotor 29, and a rotor core 30 outside the shaft 27, and ten permanent magnets 32 are embedded inside the rotor core 30 at a uniform pitch in a circumferential direction.

The stator 22 has: a stator core 20 that is constituted by a magnetic body on which are formed: a core back 33; twelve teeth 34 that are disposed at a uniform pitch, and that protrude outward from the core back 33 in a magnetic air gap length direction; and twelve slots 35 that are disposed between the teeth 34; and a plurality of coil portions that are respectively mounted to the twelve teeth 34 of this stator core 20 in concentrated windings, and that are accommodated in the slots 35.

The teeth 34 onto which the coil portions are mounted are numbered 1, 2, 3, etc., through 12 counterclockwise, the coil portions that are mounted onto the respective teeth 34 are connected to U-phase, V-phase, and W-phase electric power supplies, and are configured by being respectively connected externally so as to have four coil portions that are included in the V phase, i.e., +V11, −V12, −V21, and +V22, four coil portions that are included in the W phase, i.e., +W11, −W12, −W21, and +W22, and four coil portions that are included in the U phase, i.e., +U11, −U12, −U21, and +U22.

As shown in FIG. 16, the coil portions for each of the phases line up sequentially in order of −U21, +U22, +V11, −V12, −W21, +W22, +U11, −U12, −V21, +V22, +W11, and −W12 so as to correspond to each of Numbers 1 through 12 of the teeth 34.

Moreover, "+" and "−" indicate winding polarities of the coil portions, "+" and "−" having opposite winding polarities.

In this figure, the number of turns of the conducting wires 21 in the coil portions that are mounted to Numbers 2, 4, 6, 8, 10, and 12 of the teeth 34 is greater than the number of turns of the conducting wires 21 in the coil portions that are mounted to Numbers 1, 3, 5, 7, 9, and 11 of the teeth 34, making them overwound coil portions. Cross sections of the overwound coil portions are represented by hatching in the slots 35 in FIG. 16.

In this figure, there are six positions where a coil portion that is adjacent to an overwound coil portion has identical phase. Thus, there are six slots 35 in which coil portions for each of the phases are housed. Since the space factor of the slots 35 in which the overwound coil portions that are mounted to Numbers 2, 4, 6, 8, 10, and 12 of the teeth 34 are housed improves, the amount of heat generated can be reduced compared to when the number of turns of the conducting wires 21 of the coil portions on all of the teeth 34 is equal.

However, since respective coil portions that have identical phase are disposed adjacently in all of the coil portions, heat generated due to the electric current is concentrated between the adjacent identical-phase coil portions, increasing localized heat generation.

Since the amount of localized heat generated in the slots 35 in which single-phase coil portions are disposed is increased if the steering wheel of the electric power steering is fixed and the three-phase electric current is fixed without fluctuating, one problem has been that this leads to torque reduction due to reductions in magnetic characteristics of the permanent magnets 32 and to deterioration in performance due to heating of the circuit board 19, etc.

Figure 17A:
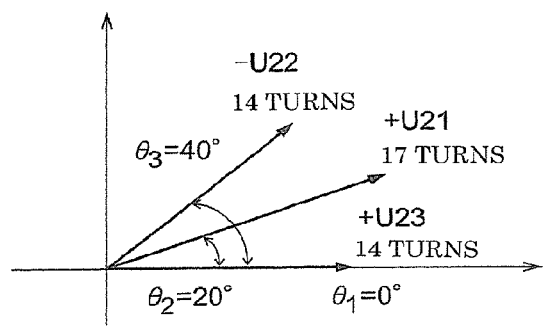
FIG. 17A is a diagram that shows magnetomotive force vectors of series coil portion groups of the electric motor according to Embodiment 1.

FIG. 17A shows electrical angular phases of the serially connected coil portions +U21, −U22, and +U23 in the U phase of the second armature winding portion 37 (see FIGS. 4 and 5) according to Embodiment 1 as a vector diagram, vector length representing the strength of the magnetomotive force that the coil portions that are mounted to each of the teeth 34 generate, and vector angle representing the electrical angular phase of the coil portions that are mounted to each of the teeth 34. Since magnetomotive force from the coil portions is proportional to the product of the number of turns and the magnitude of the electric current, vector length in the diagram is proportional to the number of turns.

Here, "electrical angular phase" is an angle when the angle that is formed by a single North-seeking (N) pole and a single South-seeking (S) pole that are adjacent to each other on the rotor 29 of the electric motor 7 is converted to 180°. If the winding polarities of the coil portions are different, then the electrical angular phase inverts by 180°.

Taking these into account, in the electric motor 7 in which the number of field poles is fourteen and the number of slots 35 in the stator 22 is eighteen that is shown in FIG. 3, for example, because the angle that is formed by the adjacent N and S poles is 360°/14=25.71°, this angle is converted to 180°.

In this electric motor 7, because the angle that is formed by two adjacent teeth 34 is 360°/18=20°, when this angle is converted to electrical angular phase, it becomes 20°×180/25.71=140°.

Moreover, in contrast to the electrical angular phase, the angle where the angle when the rotor 29 rotates through one revolution is 360° is called a "mechanical angle" or a "mechanical angular phase" or simply an "angle".

The electrical angular phases of the coil portions +U21, −U22, and +U23 that are shown in FIG. 17A are 0°, 20°, and 40°, respectively, where the coil portion +U21 is the base.

In the vector diagram, where the vector length is the magnetomotive force from the coils and vector angle is the electrical angular phase, electrical angular phase difference is defined as the angle that is formed by two vectors. Consequently, the greatest electrical angular phase difference is an electrical angular phase difference of 40° between −U22 and +U23. Here, if the electrical angular phase is set to $\theta_1=0°$ using +U23 as a base, the electrical angular phase of the coil portion +U21 is 20°, making $\theta_2=20°$, and the electrical angular phase of the coil portion −U22 is 40°, making $\theta_3=40°$. FIG. 17A shows this vector diagram, and it can be seen that that $\theta_1<\theta_2<\theta_3$.

In the examples according to this embodiment, the coil portion +U21, i.e., the coil portion for which the electrical angular phase is $\theta_2$, is an overwound coil, in which the number of turns of the conducting wire 21 is greater than other serially connected identical-phase coil portions, and since the magnetomotive force that is generated is stronger than those of −U22 and +U23, the vector length is shown larger than for others.

Figure 17B:
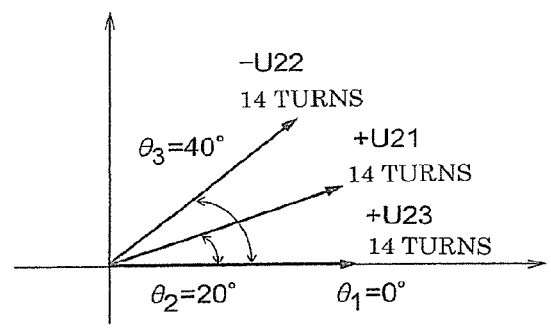
FIG. 17B is a diagram that shows magnetomotive force vectors of series coil portion groups of the electric motor in the first reference example.

As a comparative example, magnetomotive force vectors that are generated in coil portions in the U phase of the second armature winding portion 37 from FIG. 14, represented by the first reference example, in which the number of turns in all of the coil portions is equal, are shown in FIG. 17B. The magnetomotive force that the U phase generates is expressed by a resultant vector length.

In this comparative example, the magnetomotive forces that are generated by the coil portions +U21, −U22, and +U23 are equal.

Consequently, in Embodiment 1, in which the vector where the electrical angular phase that is positioned centrally is increased compared to when the number of turns of the conducting wires 21 in all of the coil portions is equal, the resultant vector length is increased, enabling magnetomotive force to be increased.

Magnetic flux density is thereby increased in the magnetic air gap portion between the stator 22 and the rotor 29 of the electric motor 7, enabling torque to be improved.

Figure 18A:
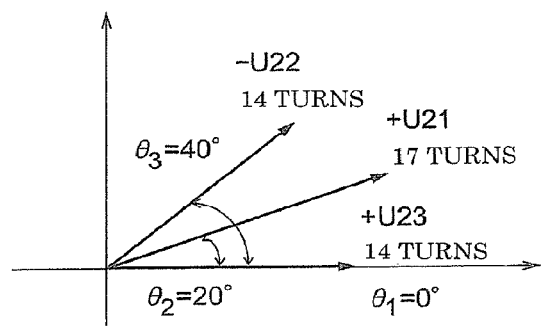
FIG. 18A is a diagram that shows magnetomotive force vectors of series coil portion groups of the electric motor according to Embodiment 1.
Figure 18B:
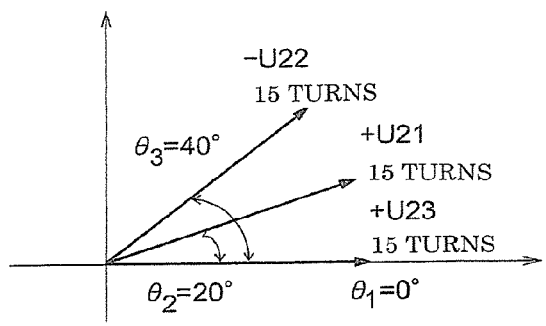
FIG. 18B is a diagram that shows magnetomotive force vectors of series coil portion groups of an electric motor that has a total number of turns of conducting wire equal to that of the electric motor according to Embodiment 1.

FIG. 18B shows, as a vector diagram, electrical angular phases of the coil portions +U21, −U22, and +U23 in the second U-phase winding portion U2 of the second armature winding portion 37 when the sum of the number of turns of the conducting wires 21 in all of the coil portions that are mounted to the teeth 34 is equal to that of Embodiment 1, which is shown in FIG. 18A, and the number of turns in all of the coil portions is equal.

Figure 19A:
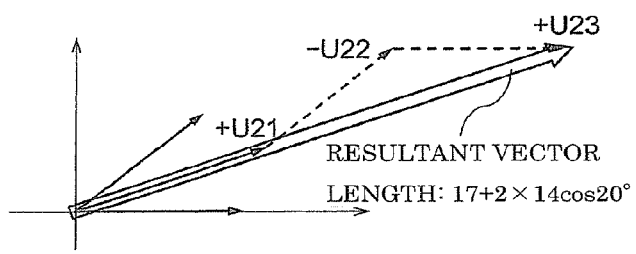
FIG. 19A is a diagram that shows a resultant magnetomotive force vector of series coil portion groups of the electric motor according to Embodiment 1.

The sum of the number of turns of the conducting wires 21 in all of the coil portions that are mounted to the teeth 34 will be called a "total number of turns". If the vector length is represented by the number of turns, the magnetomotive force of the configuration in Embodiment 1 by finding the length of the resultant vector is 17+2×14 cos 20°, as shown in FIG. 19A.

Figure 19B:
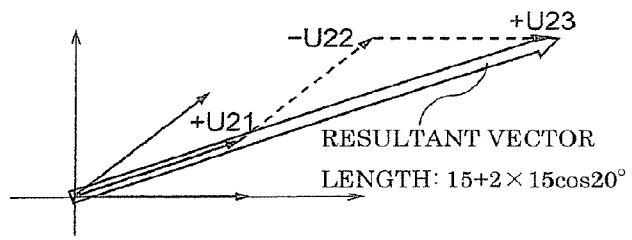
FIG. 19B is a diagram that shows a resultant magnetomotive force vector of series coil portion groups of an electric motor that has a total number of turns of conducting wire equal to that of the electric motor according to Embodiment 1.

The magnetomotive force when the total number of turns is equal to that of Embodiment 1 and the number of turns of the conducting wires 21 in all of the coil portions is equal, on the other hand, is 15+2×15 cos 20°, as shown in FIG. 19B. The difference in magnetomotive force is 2(1−cos 20°)≈0.1206, that of the configuration in Embodiment 1 being the greater.

In other words, if the total number of turns is kept constant, the configuration according to Embodiment 1 is effective in increasing magnetomotive force, and improving torque compared to configurations in which the number of turns of the conducting wires 21 in all of the coil portions is equal, as in the first reference example.

Specifically, when an electric motor that outputs torque that has a target value is designed, then since the total number of turns of the conducting wires 21 in the coil portions can be reduced, the conducting wires 21 that constitute the coil portions can be made shorter, reducing the resistance of the coil portions, and enabling the amount of heat generated to be reduced.

When an electric motor that outputs torque that has a target value is designed, the length of the resultant vector that represents the magnetomotive force can be adjusted over a range of finer values by adjusting the number of turns of the conducting wire 21 in the coil portion +U21 to make an overwound coil, or alternatively to make an underwound coil in which the number of turns is reduced compared to other coil portions.

Since the torque of the electric motor is proportional to the magnetomotive force, torque can be specified over a range of finer values, effectively improving torque design freedom of the electric motor.

Moreover, in the case of the connections that are shown in FIGS. 6 and 7, if the electrical angular phases of the serially connected U-phase coil portions −U11, +U12, −U13, +U21, −U22, and +U23 are represented in a vector diagram, since the vectors of the coil portions −U11 and +U21 coincide, the vectors of the coil portions +U12 and −U22 coincide, and the vectors of the coil portions −U13 and +U23 coincide, the vector arrangements are similar or identical to those of FIG. 18A, enabling similar or identical effects to be achieved.

In this example, the number of identical-phase coil portions is six, and if the number of serially connected coil portions is three or six, the electrical angular phases of the series coil portion group have the relationship $\theta_1 < \theta_2 < \theta_3$, and the effects can be achieved by making the number of turns of the coil portion or portions for which the electrical angular phase is $\theta_2$ different.

Generalizing this, if n is the number of identical-phase coil portions among the coil portions, where n≥3, in a series coil portion group that includes m of the above coil portions that are serially connected, where m≤n, $\theta_m$ is the largest electrical angular phase difference between two of the above coil portions, $\theta_1 = 0°$ is the electrical angular phase difference of a first of the above coil portions that have the largest electrical angular phase difference, and $\theta_2$, $\theta_3$, etc., through $\theta_m$ are the respective electrical angular phase differences of the remaining coil portions relative to the above coil portion that has an electrical angular phase difference of $\theta_1$ sequentially in increasing order, then there are electrical angular phase differences of $\theta_k$ that satisfy $\theta_1 < \theta_k < \theta_m$, where k=2, 3, etc., through m−1, and in that case, it goes without saying that effects that are similar or identical can be achieved even if the number of turns is made different in the coil portions for which the electrical angular phase is $\theta_k$.

Figure 20:
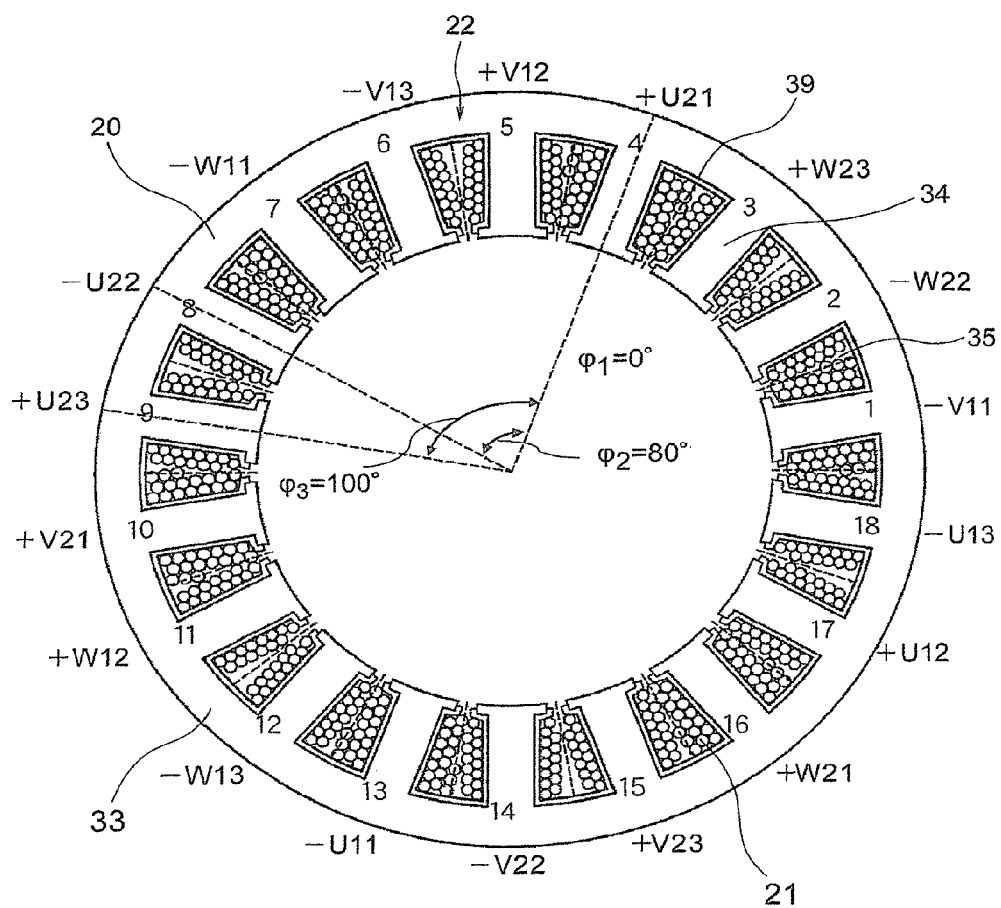
FIG. 20 is a diagram that shows mechanical angular phases of teeth of a stator from FIG. 3.

FIG. 20 shows mechanical angular phase in the second U-phase winding portion U2, which is a series coil portion group in the electric motor 7 according to Embodiment 1 that is shown in FIG. 3.

In this figure, a case is shown in which the coil portions +U21, −U22, and +U23 are connected in series. The mechanical angular phase of the tooth 34 onto which the coil portion +U21 is wound is the base, which is $\varphi_1 = 0°$. The largest electrical angle phase difference in a counterclockwise direction from the tooth 34 at Number 4 is the tooth 34 at Number 9 onto which the coil portion +U23 is wound, which is positioned at $\varphi_3 = 100°$ from the tooth 34 at Number 4. The tooth 34 at Number 8 onto which the coil portion −U22 is wound is disposed between the teeth 34 at Numbers 4 and 9, and is positioned at $\varphi_2 = 80°$ from the tooth 34 at Number 4.

Here, the tooth 34 at Number 4 onto which the coil portion +U21 is wound is adjacent to the teeth 34 onto which the coil portion +W23 and the coil portion +V12, which are in different phases, are wound.

Since the coil portion +U21 is an overwound coil compared to the coil portions −U22, +U23, +W23, and +V12, the conducting wire 21 that constitutes the coil portion is longer than those of the other coil portions, and resistance is increased, making localized heat generation more likely to concentrate there.

However, in this coil portion +U21, localized heat generation due to identical-phase electric current concentration is suppressed due to the coil portions that are adjacent on two sides thereof in the circumferential direction of the stator 22 being V-phase and W-phase, and the heat generated can be dispersed.

This is not limited to the electric motor 7 according to Embodiment 1 that is shown in FIG. 3, and even if the coil portion +U21 is an underwound coil compared to the coil portions −U22, +U23, +W23, and +V12, or if the wire diameter of the coil portion +U21 is smaller than that of the coil portions −U22, +U23, +W23, +V12, and resistance is increased, since the coil portions that are adjacent on two sides of the coil portion +U21 in the circumferential direction have different phases, the heat generated is dispersed and localized heat generation can be suppressed, as in the case of the electric motor 7 in which the number of field poles in the rotor 29 is 12n±2n and the number of slots 35 is 12n, where n is a natural number, and in the case of the electric motor 7 in which the number of field poles of the rotor 29 is 18n±2n and the number of slots 35 is 18n, where n is a natural number, compared to where coil portions that have identical phase are adjacent.

In addition, disposing the identical-phase coil portions so as to be dispersed on the stator 22 in this manner is effective in preventing the strength of the magnetic field that is generated in the magnetic air gap portion between the stator 22 and the rotor 29 from becoming nonuniform in the coil portions of each of the three phase winding portions if decentration occurs in the rotor 29.

Figure 21:
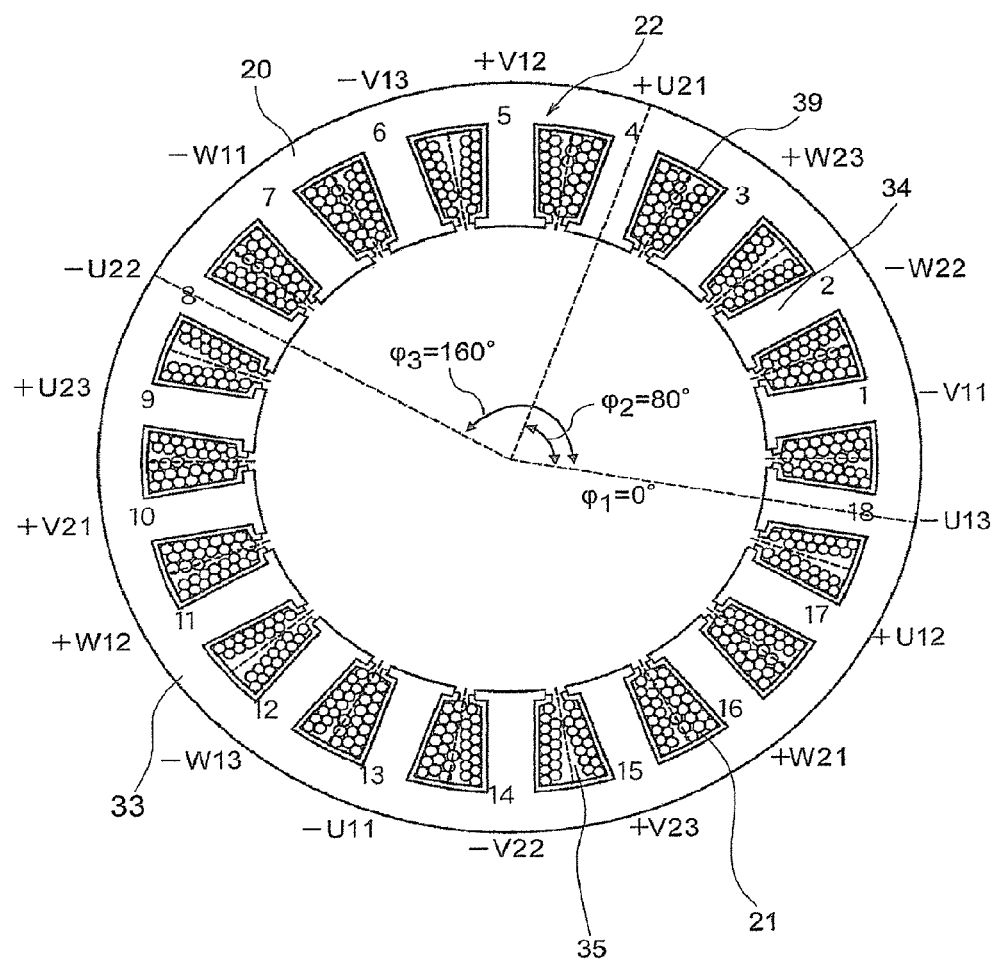
FIG. 21 is a diagram that shows mechanical angular phases of teeth of a stator of a variation of the electric motor according to Embodiment 1.

Mechanical angular phase when coil portions in the tooth 34 at Numbers 4, 8, and 18 are connected in series is shown in FIG. 21 as a first example that has a different connection method for the respective coil portions of the U phase.

Figure 22:
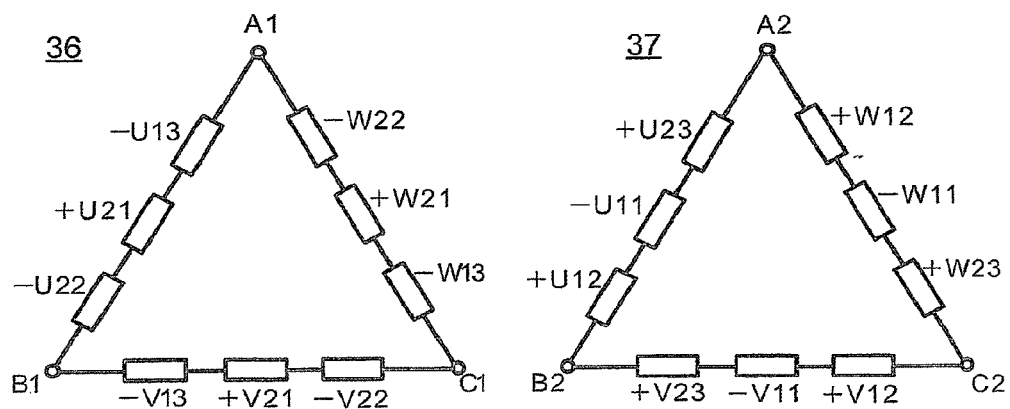
FIG. 22 is a connection diagram for the electric motor in FIG. 21 when the armature winding is delta-connected.
Figure 23:
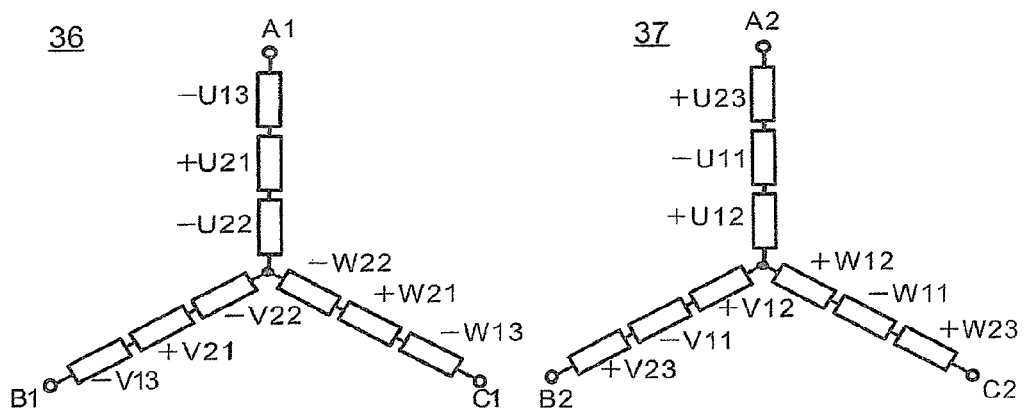
FIG. 23 is a connection diagram for the electric motor in FIG. 21 when the armature winding is wye-connected.

Connection diagrams for the armature winding 38 in this instance are shown in FIGS. 22 and 23.

FIG. 22 shows a delta-connected case, and FIG. 23 shows a wye-connected case.

In the U phase, a series coil portion group is configured in which respective coil portions of −U13, +U21, and −U22 are connected in series.

Figure 24:
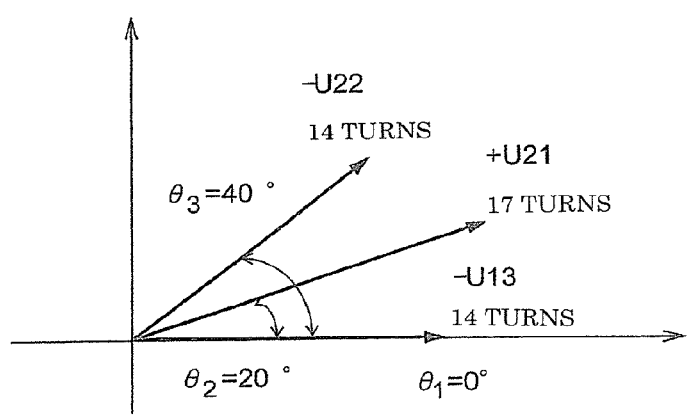
FIG. 24 is a vector diagram of electrical angular phases of respective coil portions of a U-phase series coil portion group in the armature windings that are shown in FIGS. 22 and 23.

FIG. 24 shows a vector diagram of electrical angular phases of respective coil portions of a U-phase series coil portion group in the armature windings that are shown in FIGS. 22 and 23.

Since this figure is similar or identical to FIGS. 17A and 18A, except that the numbers of the teeth 34 of the respective coil portions that are connected are different than in FIG. 20, the magnetomotive forces that are generated are similar or identical to those of FIG. 20.

Here, the mechanical angular phase of the tooth 34 at Number 1 onto which the coil portion −U13 is wound is the base, which is $\varphi_1 = 0°$. The largest electrical angle phase difference in a counterclockwise direction from the tooth 34 at Number 18 is the tooth 34 at Number 8 onto which the coil portion −U22 is wound, which is at $\varphi_3 = 160°$. When the tooth 34 at Number 8 is viewed from the tooth 34 at Number 18, which is the base, the tooth 34 at Number 4 is disposed between the teeth 34 at Numbers 18 and 8, and the mechanical angular phase of the tooth 34 at Number 4 is $\varphi_2 = 160°$.

In this case, the tooth 34 at Number 4 onto which the overwound coil portion +U21 is wound is also adjacent to the teeth 34 onto which the coil portion +W23 and the coil portion +V12, which are in different phases, are wound, enabling similar or identical effects to those in FIG. 20 to be achieved.

Figure 25:
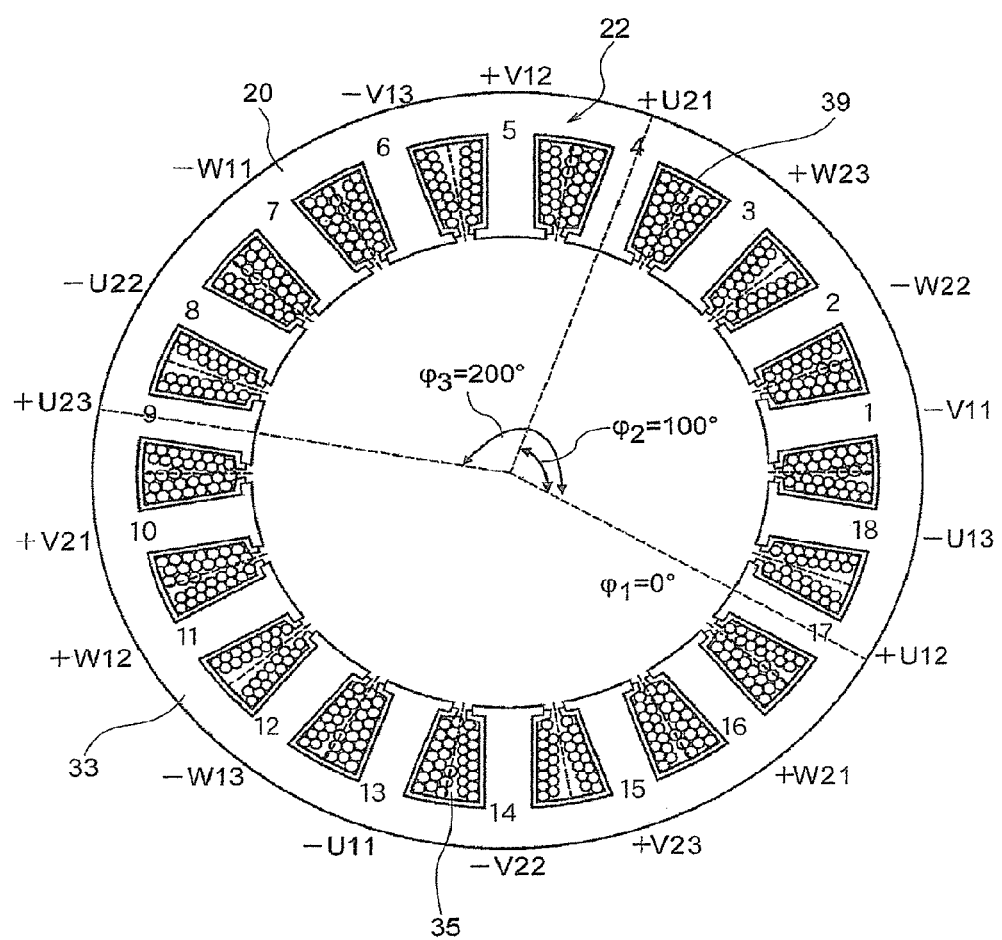
FIG. 25 is a diagram that shows mechanical angular phases of teeth of a stator of another variation of the electric motor according to Embodiment 1.

In addition, mechanical angular phase when coil portions in the tooth 34 at Numbers 4, 9, and 17 are connected in series is shown in FIG. 25 as a second example that has a different connection method for the coil portions of the U phase.

Figure 26:
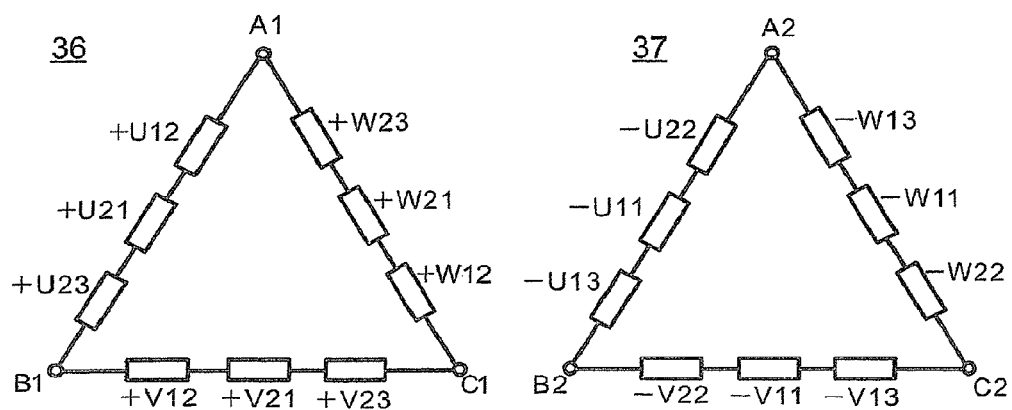
FIG. 26 is a connection diagram for the electric motor in FIG. 25 when the armature winding is delta-connected.
Figure 27:
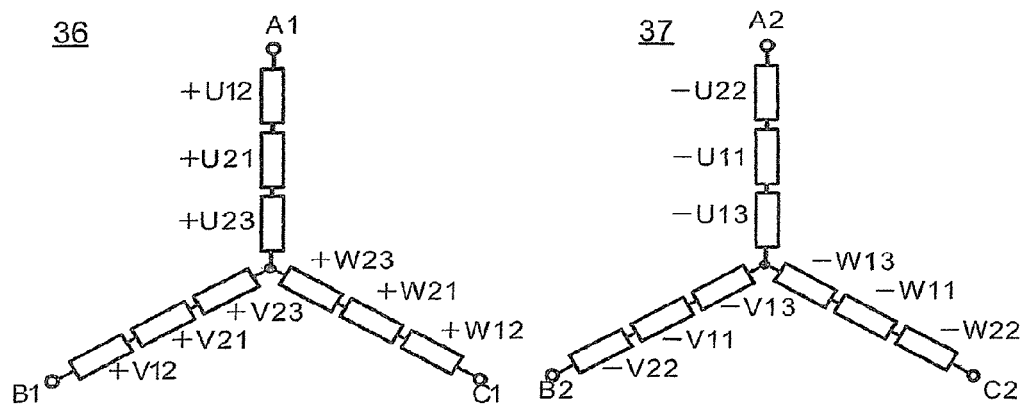
FIG. 27 is a connection diagram for the electric motor in FIG. 25 when the armature winding is wye-connected.

Connection diagrams for the armature winding 38 in this instance are shown in FIGS. 26 and 27.

FIG. 26 shows a delta-connected case, and FIG. 27 shows a wye-connected case.

In the U phase, a series coil portion group is configured in which respective coil portions of +U12, +U21, and −U23 are connected in series.

Figure 28:
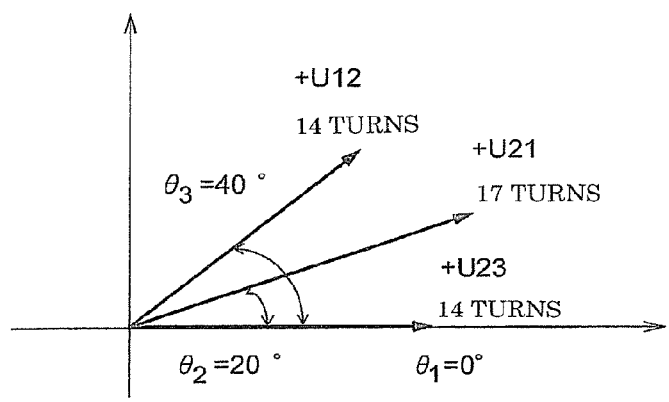
FIG. 28 is a vector diagram of electrical angular phases of coil portions that constitute a U phase of an armature winding portion in the connection methods that are shown in FIGS. 26 and 27.

FIG. 28 shows a vector diagram of electrical angular phases of coil portions of that constitute a U phase of an armature winding portion 36 in the connection methods that are shown in FIGS. 26 and 27.

Since this figure is similar or identical to FIGS. 17A and 18A, except that the numbers of the teeth 34 of the respective coil portions that are connected are different than in FIG. 20, the magnetomotive forces that are generated are similar or identical to those of FIG. 20.

Here, the mechanical angular phase of the tooth 34 at Number 17 onto which the coil portion +U12 is wound is the base, which is $\varphi_1=0°$. The largest electrical angle phase difference in a counterclockwise direction from the tooth 34 at Number 17 is the tooth 34 at Number 9 onto which the coil portion +U23 is wound, which is at $\varphi_3=200°$. When the tooth 34 at Number 8 is viewed from the tooth 34 at Number 17, which is the base, the tooth 34 at Number 4 is disposed between the teeth 34 at Numbers 17 and 9, and the mechanical angular phase of the tooth 34 at Number 4 is $\varphi_2=100°$.

In this case, the tooth 34 at Number 4 onto which the overwound coil portion +U21 is wound is also adjacent to the teeth 34 onto which the coil portion +W23 and the coil portion +V12, which are in different phases, are wound, enabling similar or identical effects to those in FIG. 20 to be achieved.

Cases in which the coil portion +U21 is an overwound coil portion or an underwound coil portion compared to the coil portions −U22 and +U23 have been mentioned above, but the coil portion −U22 and the coil portion +U23 may be overwound coils or underwound coils compared to the coil portion +U21.

Since the total number of turns can be specified in even more detail, the torque of the electric motor 7 can be specified in even more detail, enabling torque design freedom of the electric motor to be improved.

Furthermore, as shown in FIG. 3, in the electric motor 7 according to this embodiment, the coil portion −U22 and the coil portion +U23, which are identical in phase, are adjacent.

Resistance can be reduced by making the coil portion −U22 and the coil portion +U23 overwound coils or underwound coils compared to the coil portion +U21, reducing the amount of heat generated at positions where the identical phases are adjacent, enabling the concentration of generated heat to be suppressed.

As shown in FIG. 3, the number of turns in the coil portions that are adjacent to each of the teeth B that have an overwound coil portion is different than the number of turns on the teeth B. Gaps in the slots 35 are thereby reduced compared to the configuration in FIG. 14 in which the number of turns in all of the coil portions is made equal, enabling space factor of the coil portions to be improved. Consequently, by improving the space factor, the cross-sectional area of the coil portions relative to the area of the slots 35 is increased, enabling the amount of heat generated to be reduced.

Moreover, if the manufacturing method that was mentioned in the first reference example is adopted in the examples according to this embodiment in which the number of turns is different within the construction of a single stator 22, manufacturing is possible by inserting bobbins that are mounted to the teeth A into the inner core 57 first, and inserting insulators that are mounted to the teeth B afterwards.

In this case, as shown in FIG. 3, the construction is such that coil portions on one side protrude beyond the central broken lines of the slots 35.

From the above, it is possible to manufacture the above construction that reduces the gaps in the slots 35 by adopting the teeth B that have overwound coil portions, enabling reductions in the amount of heat generated to be achieved.

As shown in FIG. 3, the wire diameter of the coil portions that are mounted to the teeth B that have overwound coil portions is larger than the wire diameter of the other identical-phase coil portions that are serially connected to those coil portions.

For example, the coil portions that are connected in series to the coil portion −V11 that is mounted to the tooth 34 at Number 1 are the coil portion +V12 that is mounted to the tooth 34 at Number 5, and the coil portion −V13 that is mounted to the tooth 34 at Number 6, and the wire diameter of the coil portion −V11 is larger than that of to the coil portions +V12 and −V13.

By making the wire diameter different in this manner, gaps in the slots 35 are reduced, improving space factor of the coil portions in the slots 35, reducing the resistance of the coil portions, and enabling the amount of heat generated to be reduced.

As shown in FIG. 3, the arrangement of the coil portions in each phase in the stator 22 is identical even if the stator 22 is rotated by 180° around its center.

The arrangement of the respective number of turns of the conducting wires 21 in the stator 22 is also identical even if the stator 22 is rotated by 180° around its center.

In other words, if the arrangement of the coil portions and the number of turns in each phase in an upper half of the stator 22 that includes the teeth 34 at Numbers 1 through 9 is rotated by 180° around the center of the stator 22, it is similar to the arrangement of the coil portions and the number of turns in each phase in a lower half of the stator 22 that includes the teeth 34 at Numbers 10 through 18.

Here, because the magnetomotive forces that the respective coil portions of the stator 22 generate are expressed as a product of the respective number of turns and the electric current, distribution of the magnetomotive forces in the stator 22 is also identical if the stator 22 is rotated by 180° around its center.

This means that the magnetomotive forces have rotational symmetry by 180°, i.e., rotational symmetry for two iterations.

The examples according to this embodiment have 180° rotational symmetry, but to generalize this, if, when rotated P degrees around the stator 22, where P is an integer, the arrangement of the phases and the number of turns is similar or identical to that prior to rotation, then it has rotational symmetry by P degrees, i.e., rotational symmetry for 360/P iterations.

These magnetomotive forces are one factor in the generation of electromagnetic vibrational forces that arise in a radial direction of the stator 22, and electromagnetic vibrational forces are known to be proportional to these magnetomotive forces in the armature winding.

The electromagnetic vibrational forces that arise in the radial direction of the stator 22 are factors of noise and vibration in the electric motor, and spatial first-order electromagnetic vibrational forces in particular give rise to rattling noise in the bearings of an electric motor, making reduction desirable since they are a major source of noise.

Thus, by making the magnetomotive forces that the respective coil portions of the stator 22 generate rotationally symmetrical by 180°, as described above, it becomes possible to suppress the generation of spatial first-order electromagnetic vibrational forces that constitute a major source of noise.

Figure 29:
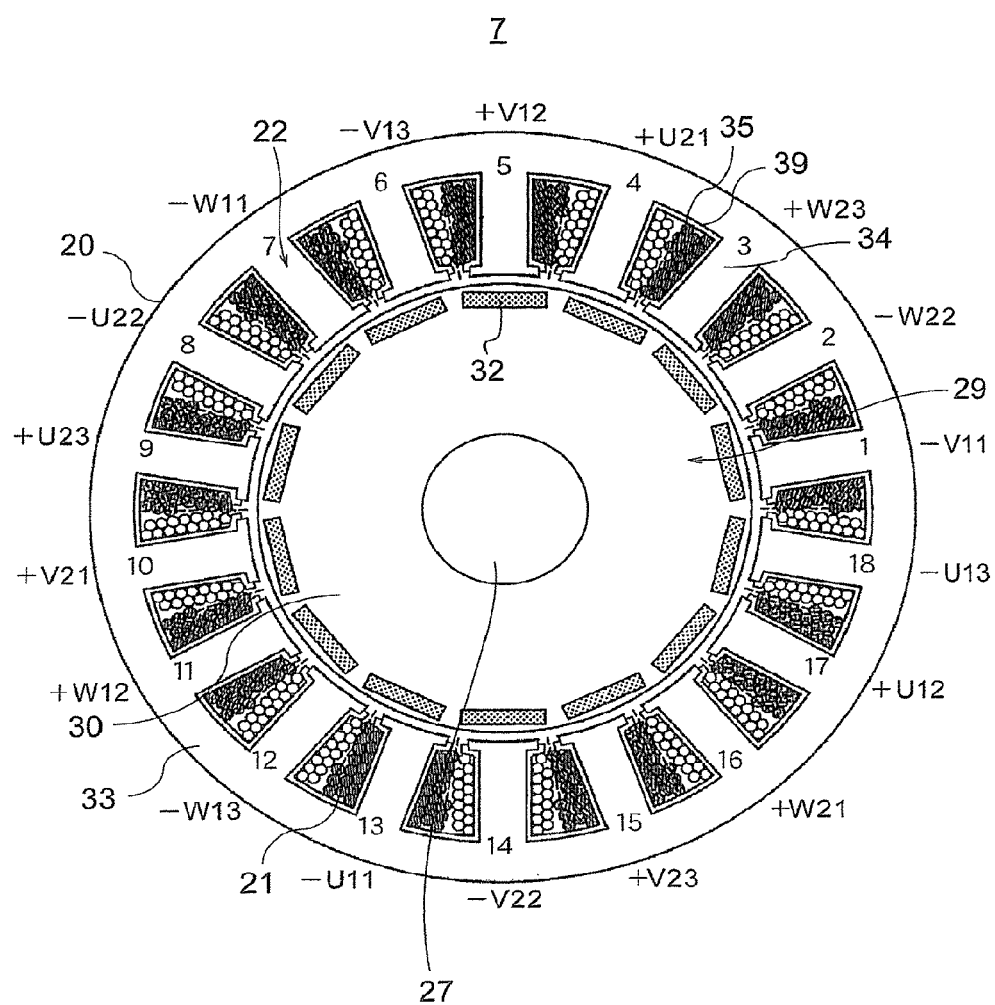
FIG. 29 is a frontal cross section that shows another variation of the electric motor according to Embodiment 1.

FIG. 29 is a frontal cross section of an electric motor 7 that shows a configuration in which the number of turns of the conducting wires 21 is increased in coil portions that are mounted to each of the teeth 34 at Numbers 1, 3, 5, 7, 9, 11, 13, 15, and 17.

In the configuration that is shown in FIG. 29, coil portions that have a different number of turns are disposed in all of the slots 35, further reducing gaps in the slots 35 compared to those of Embodiment 1, which is shown in FIG. 3, thereby further improving space factor in the slots 35.

However, in the configuration that is shown in FIG. 29, the arrangement of the numbers of turns, i.e., the distribution of the magnetomotive forces are not rotationally symmetrical by 180°. Consequently, the configuration in the figure will be called an "asymmetrical magnetomotive force configuration".

Figure 30:
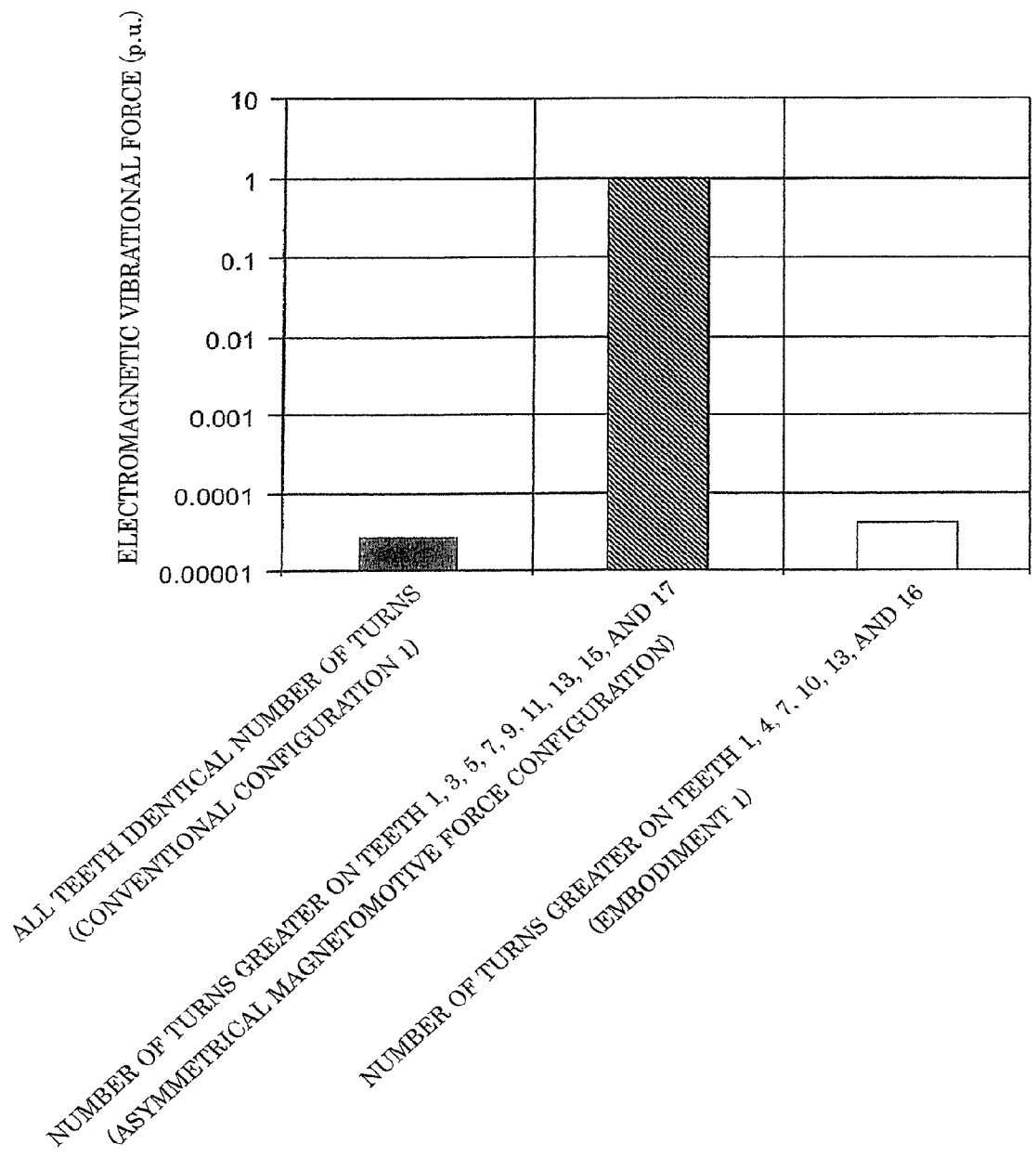
FIG. 30 is a bar graph that shows electromagnetic vibrational forces in the electric motor according to Embodiment 1.

Now, values of spatial first-order electromagnetic vibrational force in the electric motors 7 according to the first reference example and Embodiment 1 were compared where the spatial first-order electromagnetic vibrational force in an asymmetrical magnetomotive force configuration was set to 1, the results being shown in FIG. 30.

From this figure, whereas spatial first-order electromagnetic vibrational force is generated in the asymmetrical magnetomotive force configuration, it is suppressed in Embodiment 1 so as to be approximately equal to that of the first reference example.

Consequently, by making the arrangement of the coil portions in which the number of turns are made different rotationally symmetrical by 180° relative to the stator 22, it is possible to suppress spatial first-order electromagnetic vibrational forces that constitute a noise source from increasing while retaining the above-mentioned effects of making the number of turns different.

In the examples according to this embodiment, the rotational symmetry is by 180°=360°/2, i.e., the rotational symmetry is for two iterations, and since the spatial order components that are present in the magnetomotive forces are second-order or greater, spatial first-order electromagnetic vibrational forces are not generated, but generalizing this, if the distribution of the number of turns is rotationally symmetrical by 360°/L, where L is a natural number that is greater than or equal to two, i.e., rotationally symmetrical for L iterations, then it goes without saying that spatial first-order electromagnetic vibrational forces are not generated since the spatial order components that are present in the magnetomotive forces are greater than or equal to L-th order.

Moreover, there is no problem even if an arrangement that is rotationally symmetrical for L iterations drifts within manufacturing errors (at a mechanical angle of approximately ±10°), since the electromagnetic vibrational forces of FIG. 30 will not increase to the level of the example in FIG. 29.

In the electric motor 7 in which the number of magnetic field poles is fourteen and the number of teeth 34 and slots 35 is eighteen, as described above, the electrical angular phases of the coil portions that constitute the respective series coil portion groups thereof have an arrangement in which three magnetomotive force vectors line up so as to have a phase difference of 20°, as shown in FIGS. 17A and 18A.

Since the distribution of the magnetomotive forces in the example according to this embodiment is rotationally symmetrical by 180°, as described above, a maximum of two sets of three phases can be configured within one 360° lap of the electric motor 7.

Consequently, by making the number of parallel arms in the circuits one or two, the number of coils that constitute an identical-phase series coil portion group can be made six or three.

Consequently, by making the coils that correspond to the three magnetomotive force vectors that line up at this electrical angle phase difference of 20° one set, and so as to have identical phase, the total number of turns in each of the series coil portion groups that have identical phase can be made equal, as shown in FIGS. 17A and 18A.

In the examples according to this embodiment, cases in which the number of parallel arms in the circuits is one or two are shown, but if the distribution of the number of turns and the magnetomotive forces mentioned above is rotationally symmetrical by 360°/L, then a maximum of L sets of three phases can be configured within one 360° lap of the electric motor 7.

Consequently, by making the number of parallel arms in the circuits equal to L, configurations are possible in which the total number of turns in each of the identical-phase series coil portion groups is made equal.

Here, since the induced voltages that are generated in each of the series coil portion groups of each of the identical-phase series coil portion groups become equal, one effect is that cyclic currents are not generated in the parallel circuits of each of the phases.

The electric motor 7 according to this embodiment has "concentrated windings", in which coil portions are mounted so as to be concentrated on the teeth 34, also enabling effects to be achieved such as making coil ends small, being compact, reducing copper loss, and having low heat generation and high efficiency.

Because there are (18±4)y field poles and the number of teeth 34 and slots 35 is 18y, where y is a natural number, torque can be improved compared to when there are (3±1)y field poles and the number of teeth 34 or slots 35 is 3y.

Electromagnetic vibrational forces that arise in spatial second-order stator cores 20 can be reduced compared to when there are (12±2)y field poles and the number of teeth 34 or slots 35 is 12y, enabling effects to be achieved such as enabling vibration noise to be reduced.

Because harmonic winding factors are reduced, particularly the 6f components and 12f components, which are major components of torque ripples, torque ripples can be reduced.

Figure 31:
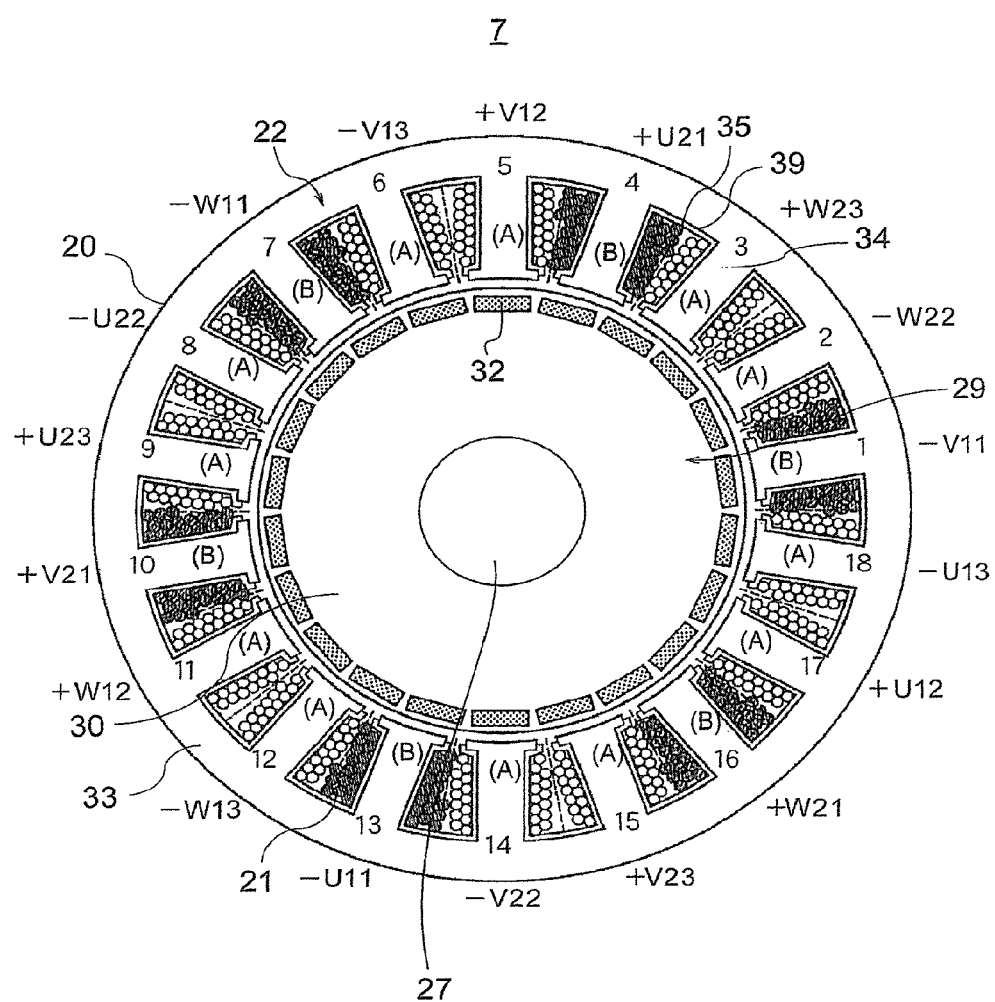
FIG. 31 is a frontal cross section that shows another variation of the electric motor according to Embodiment 1.

FIG. 31 shows a different configuration of the poles and slots 35 in Embodiment 1.

There are twenty-two field poles and the number of teeth 34 is eighteen. Since the arrangement of the coil portions in the circumferential direction is similar or identical to that in FIG. 3, it goes without saying that effects that are similar or identical to the above can be achieved.

The field poles are permanent magnets 32, but it goes without saying that a reluctance-type rotary electric machine that does use permanent magnets 32 may be used, or the field poles may be formed by mounting windings to a rotor core and passing an electric current therethrough.

FIGS. 3, 10, and 11 are frontal cross sections of electric motors 7 that shows this embodiment and variations of this embodiment, but those in FIGS. 10 and 11, in particular, in which tip portions of the teeth 34 that are on a side near the rotor 29 are linked to the tip portions of adjacent teeth 34, can release heat through linking of the tooth 34.

Consequently, pathways that transfer heat are formed by the constructions of these variations, enabling temperature increases in the electric motor 7 to be reduced.

In the electric motor 7 according to this embodiment, as shown in FIG. 3, the coil portions −V11, +U21, −W11, +V21, −U11, and +W21 are equal in wire diameter. These coil portions each belong to separate series coil portion groups and, for example, the coil portion +U21 belongs to the series coil portion group that is constituted by the coil portions −U22, +U21, and +U23, as shown in FIGS. 4 and 5.

The coil portion +U21 is positioned at an intermediate electrical angular phase between the other two identical-phase series coil portions −U22 and +U23.

Similarly, the coil portions −V11, −W11, +V21, −U11, and +W21 in each of the series coil portion groups are positioned at intermediate electrical angular phases between the other coil portions.

In other words, if the armature winding 38 is constituted by parallel circuits that include a first armature winding portion 36 and a second armature winding portion 37, the wire diameters of the coil portions in the series coil portion groups that constitute the parallel circuit are equal to the wire diameters of the coil portions that have equal electrical angular phase in other series coil portion groups.

Because the resistance values of each of the series coil portion groups thereby become equal, one effect is that electric current does not become unbalanced in the respective series coil portion groups when equal voltages are applied to each of the series coil portion groups.

Since the magnetomotive force distribution is disturbed if electric current becomes unbalanced in the respective phases of the circuits of the electric motor 7, or in the parallel circuits that constitute the respective phases, one problem has been that torque ripples are increased, but this problem does not arise in the examples according to this embodiment.

Figure 32:
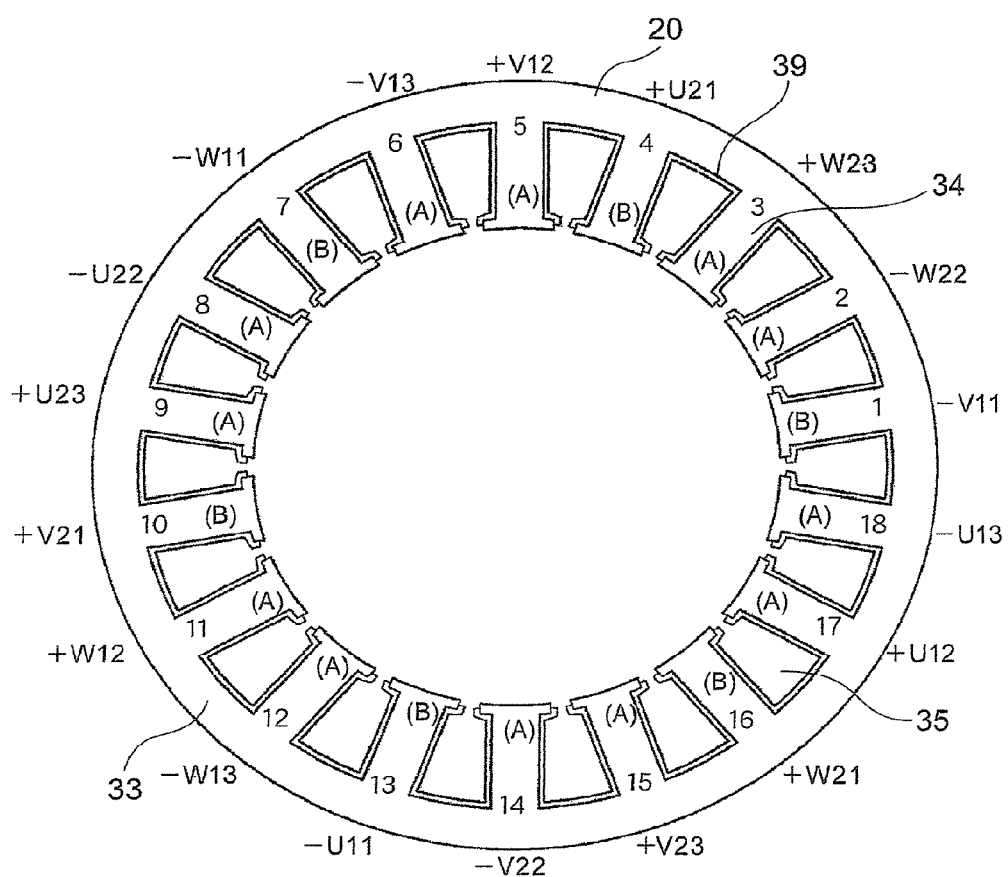
FIG. 32 is a frontal cross section that shows a stator core from FIG. 3.

FIG. 32 shows the stator 22 in this embodiment.

Here, a turn ratio is defined as a ratio between the number of turns in the coil portions that are mounted to the teeth A and the number of turns in the coil portions that are mounted to the teeth B, and is given by (the turn ratio)=(the number of turns (ß) in the coil portions that are mounted to the teeth B)/(the number of turns (α) in the coil portions that are mounted to the teeth A).

For example, as shown in FIG. 3 of this embodiment, because the number of turns (α) in the coil portions that are mounted to the teeth A is fourteen, and the number of turns (ß) in the coil portions that are mounted to the teeth B is seventeen, the turn ratio is (ß/α)=17/14=1.214.

Turn ratios when the numbers of turns in the coil portions of the teeth A and the teeth B are varied are presented in a table in FIG. 33.

Combinations of numbers of turns have been selected for which the sums of the numbers of turns in all of the coil portions that are mounted to the stator 22, i.e., the total numbers of turns, are equal.

For example, whereas the total number of turns when α=12 and ß=12 in this figure is 12×6+12×12=216, the total number of turns when α=11 and ß=14 in this figure is 11×12+14×6=216, which are equal values. The total numbers of turns in a remainder of the combinations are also 216.

As in the first reference example that is shown in FIG. 14, the generated torque in an electric motor 7 in which the number of turns in all of the coil portions is equal is approximately proportional to the product of the electric current value that is applied to the coil portions and the total number of turns.

Consequently, combinations of numbers of turns were selected such that generated torque of the electric motor 7 became approximately equal by making the total numbers of turns equal to each other and making the applied electric currents equal.

Figure 34:
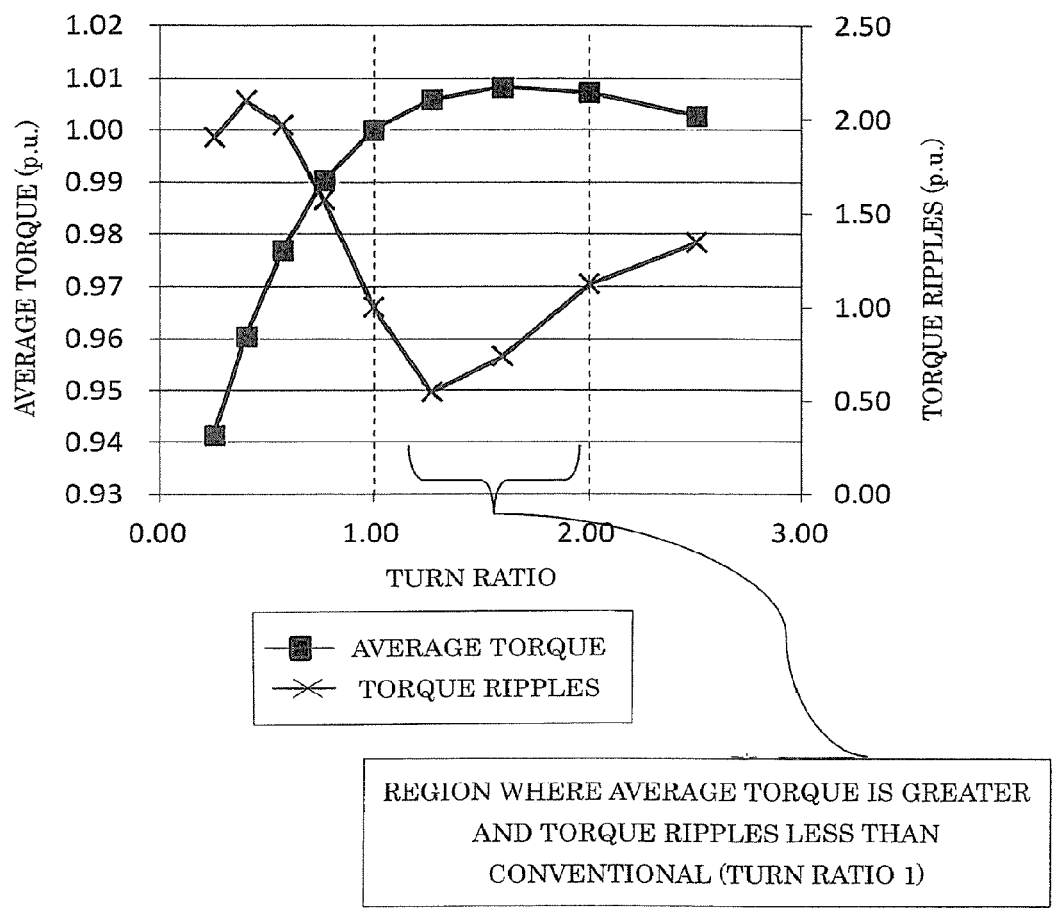
FIG. 34 is a line graph that shows changes in average torque and torque ripples relative to the turn ratios when the number of turns in the electric motor according to Embodiment 1 is varied.

Analytical calculations were performed using the combinations of numbers of turns that are shown in FIG. 33, and the calculated results are shown in FIG. 34 represented as relationships between average torque and torque ripples relative to the turn ratio.

The average torque and torque ripples are both represented as ratios for which the value is 1 when α=12 and ß=12.

From this figure, average torque is at a maximum at a turn ratio of 1.60, and torque ripples are at a minimum at a turn ratio of 1.27. If the turn ratio is greater than 1.0 and less than or equal to 2.0, then effects can be achieved by which the average torque is improved and torque ripples are less than or equal to when the turn ratio is 1, which corresponds to the first reference example.

Embodiment 2

Figure 35:
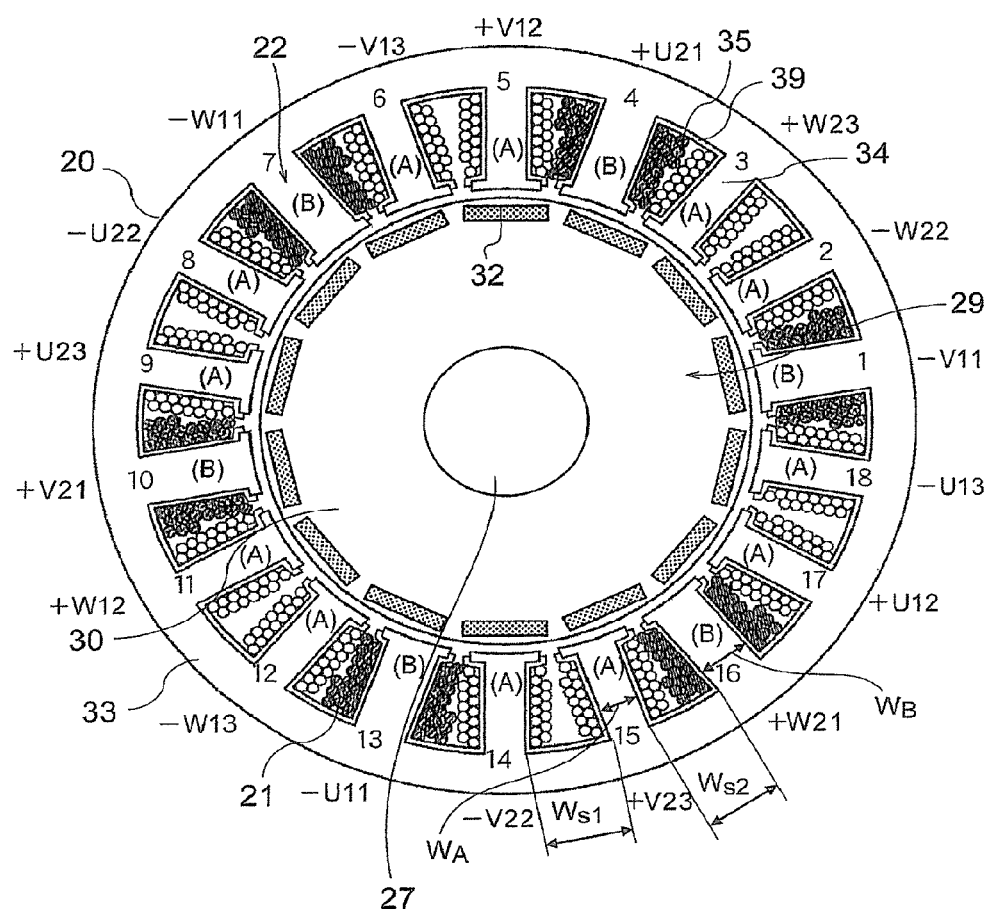
FIG. 35 is a frontal cross section that shows an electric motor according to Embodiment 2.

FIG. 35 is a frontal cross section that shows an electric motor 7 according to Embodiment 2 of the present invention.

In the electric motor 7 according to this embodiment, a circumferential width $W_B$ of teeth B onto which overwound coil portions are mounted is greater than a circumferential width $W_A$ of teeth A.

A remainder of the configuration is similar or identical to that of the electric motor 7 according to Embodiment 1 that is shown in FIG. 3.

In this electric motor 7, magnetic saturation is less likely to occur in the teeth 34 to which the overwound coil portions are mounted, enabling torque improvement and reductions in torque ripples to be achieved.

If underwound coil portions are mounted to the teeth B, the width of the slots 35 in which the coil portions that are mounted to the teeth B are housed can be increased instead by making the width $W_B$ smaller than the width $W_A$, and resistance can be reduced by increasing the wire diameter of the coils that are mounted to the teeth B, enabling reductions in the amount of heat generated to be achieved.

Embodiment 3

Figure 36:
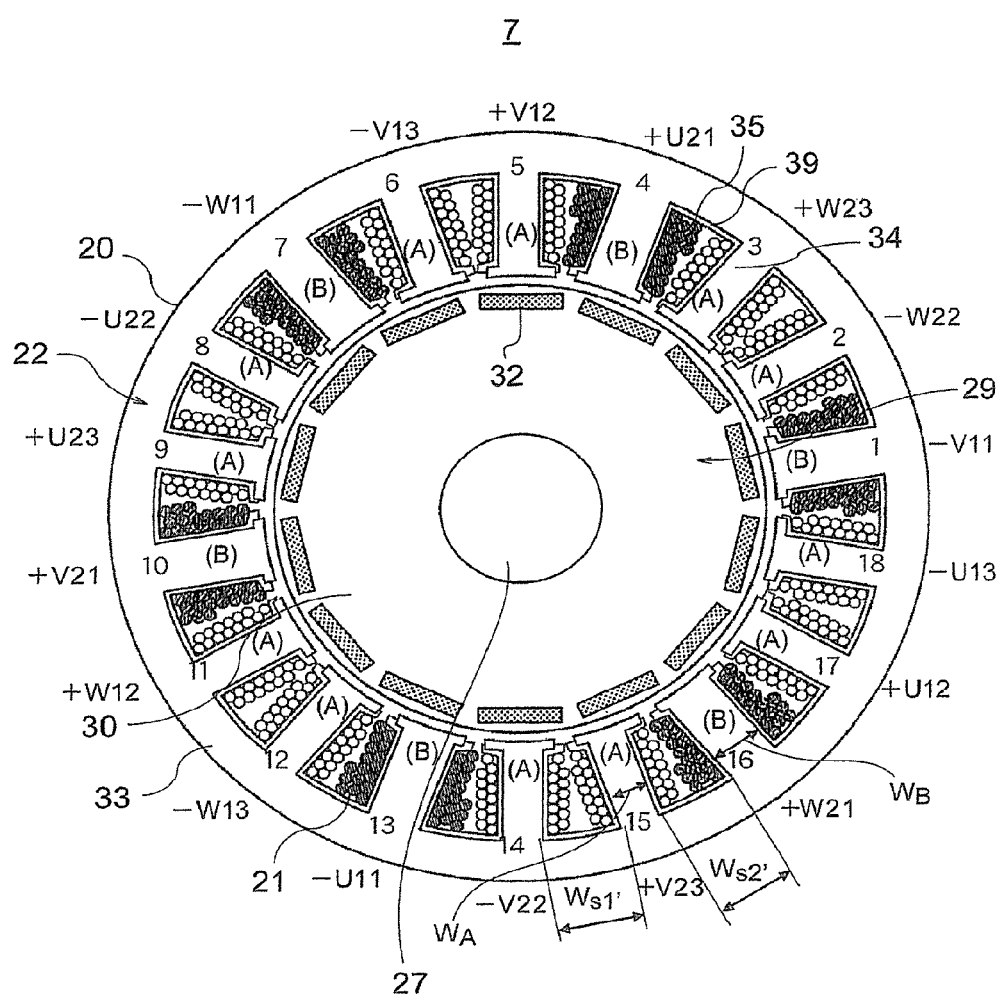
FIG. 36 is a frontal cross section that shows an electric motor according to Embodiment 3.

FIG. 36 is a frontal cross section that shows an electric motor 7 according to Embodiment 3 of the present invention.

In the electric motor 7 according to this embodiment, in addition to increasing a circumferential width of teeth B that have overwound coil portions to make $W_B > W_A$, a circumferential width $W_{S2}'$ of slots 35 in which the coil portions that are mounted to the teeth B are housed is increased, and a width $W_{S1}'$ of a remainder of the slots 35 is reduced compared to those in FIG. 35.

A remainder of the configuration is similar or identical to that of the electric motor 7 according to Embodiment 1 that is shown in FIG. 3.

In the configuration in FIG. 35, a circumferential width of the slots 35 in which the coil portions that are mounted to the teeth B are housed is $W_{S2}$, and a circumferential width of a remainder of the slots 35 is $W_{S1}$, but in the configuration in FIG. 36, compared to the respective width values $W_{S1}'$ and $W_{S2}'$, $W_{S1}' < W_{S1}$, and $W_{S2}' > W_{S2}$.

Gaps are thereby increased in the slots 35 in which the overwound coil portions −V11, +U21, −W11, +V21, −U11, and +W21 are housed compared to the configuration in FIG. 35 in which only the circumferential width of the teeth 34 was changed, enabling a greater number of turns of conducting wire 21 to be wound onto the teeth 34, and improving freedom in selecting the number of turns.

Additionally, one effect is that gaps in a remainder of the slots 35 in which the overwound coil portions are not housed are reduced, improving space factor.

Figure 37:
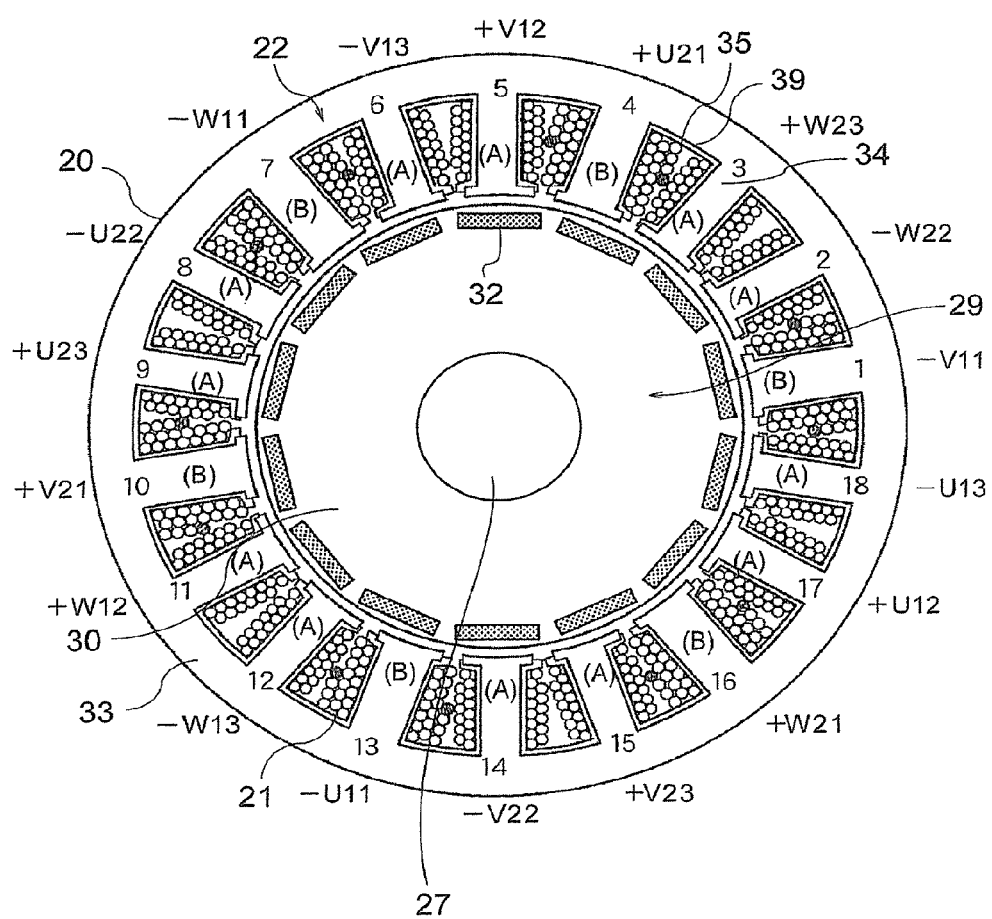
FIG. 37 is a frontal cross section that shows a variation of Embodiment 3.

FIG. 37 is a frontal cross section that shows a variation of the electric motor 7 according to Embodiment 3.

In this variation, an example is shown in which, in addition to the modifications to the width of the teeth 34 and the modification to the width of the slots 35 that are shown in FIG. 36, the number of turns of the conducting wires 21 on the teeth B onto which the overwound coil portions are wound is increased by a single turn. In this figure, the cross sections of the additional single turns of the conducting wires 21 inside the slots 35 are hatched.

By making the circumferential widths of the slots 35 different in this manner, the area of the slots 35 is used effectively, increasing freedom in selecting the number of turns, and enabling torque performance to be improved.

Embodiment 4

Figure 38:
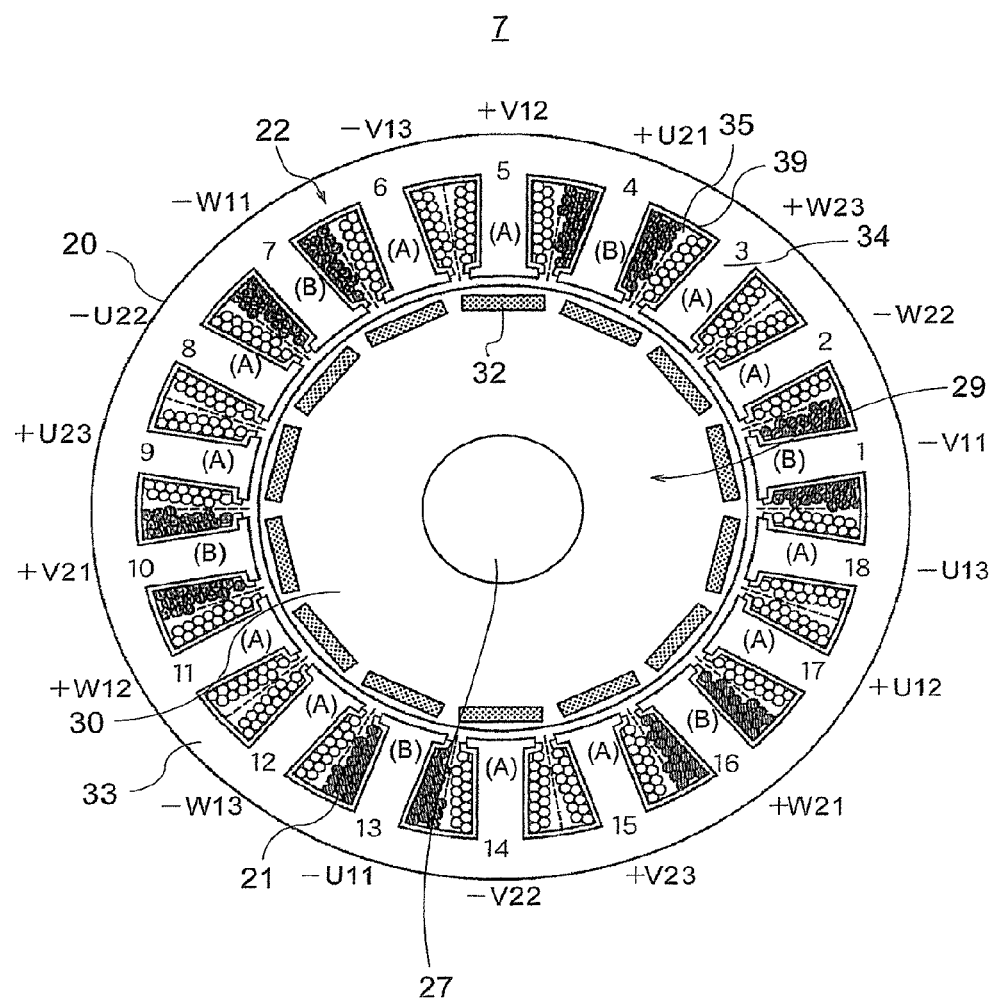
FIG. 38 is a frontal cross section that shows an electric motor according to Embodiment 4.

FIG. 38 is a frontal cross section that shows an electric motor according to Embodiment 4.

In this embodiment, a wire diameter of conducting wires 21 of coil portions that are mounted to teeth B is equal to a wire diameter of the conducting wires 21 on teeth A.

A remainder of the configuration is similar or identical to that of the electric motor 7 according to Embodiment 1 that is shown in FIG. 3.

In this embodiment, since the coil portions that are mounted to each of the teeth 34 can be configured using conducting wires 21 that have one wire diameter, similar or identical effects to those of Embodiment 1 can also be achieved while increasing manufacturability.

Embodiment 5

Figure 39:
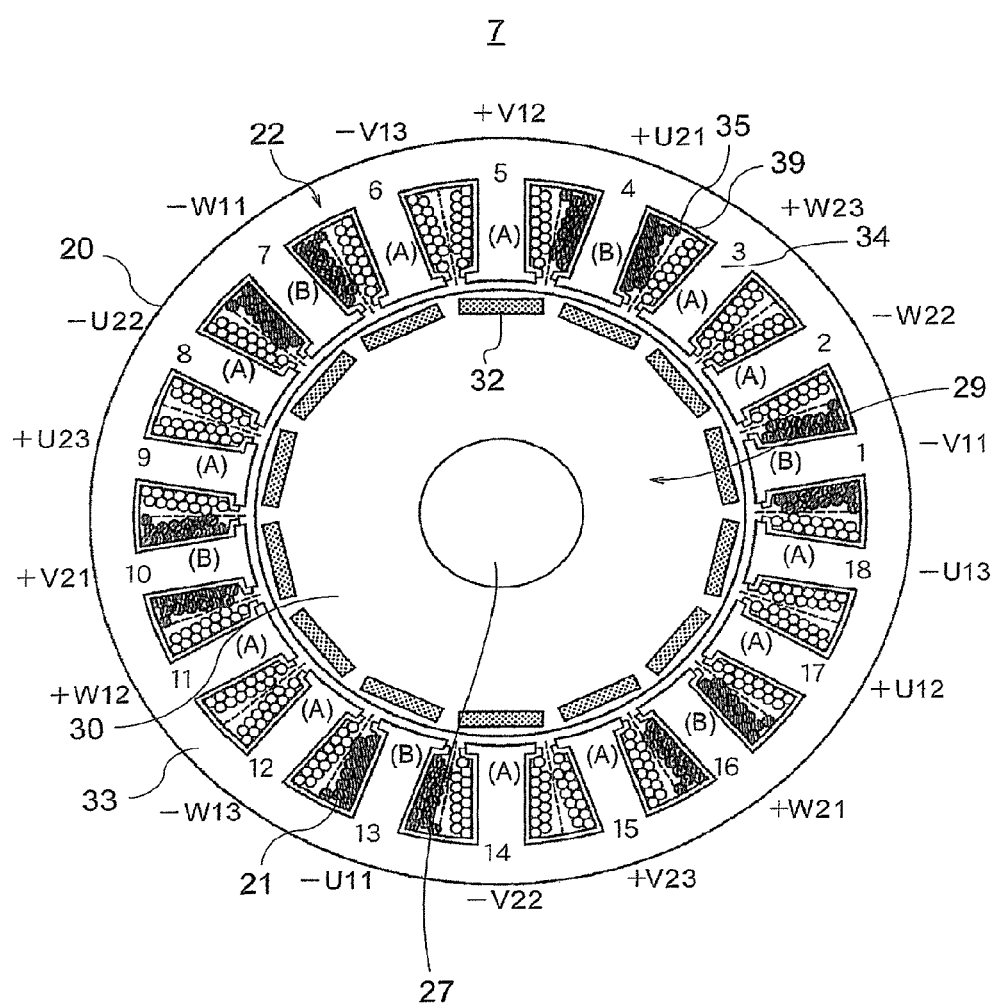
FIG. 39 is a frontal cross section that shows an electric motor according to Embodiment 5.

FIG. 39 is a frontal cross section that shows an electric motor 7 according to Embodiment 5.

In this embodiment, the number of turns of conducting wire 21 in coil portions that are mounted to teeth B is equal to the number of turns of the conducting wire 21 in coil portions on teeth A, and a wire diameter of conducting wires 21 of coil portions that are mounted to teeth B is different than a wire diameter of the conducting wires 21 on teeth A.

In this figure, the cross sections of the coil portions on the teeth 34 to which the coil portions are mounted in which the wire diameter of the conducting wire 21 is different are hatched.

A remainder of the configuration is similar or identical to that of the electric motor 7 according to Embodiment 1 that is shown in FIG. 3.

In a configuration in which the number of turns in all of the coil portions is equal, and in which there are coil portions in which the wire diameter of the conducting wires 21 is different, as in the electric motor 7 according to this embodiment, effects such as space factor of the coil portions in the slots 35 being improved and the amount of heat generated being reduced can also be achieved.

Embodiment 6

Figure 40:
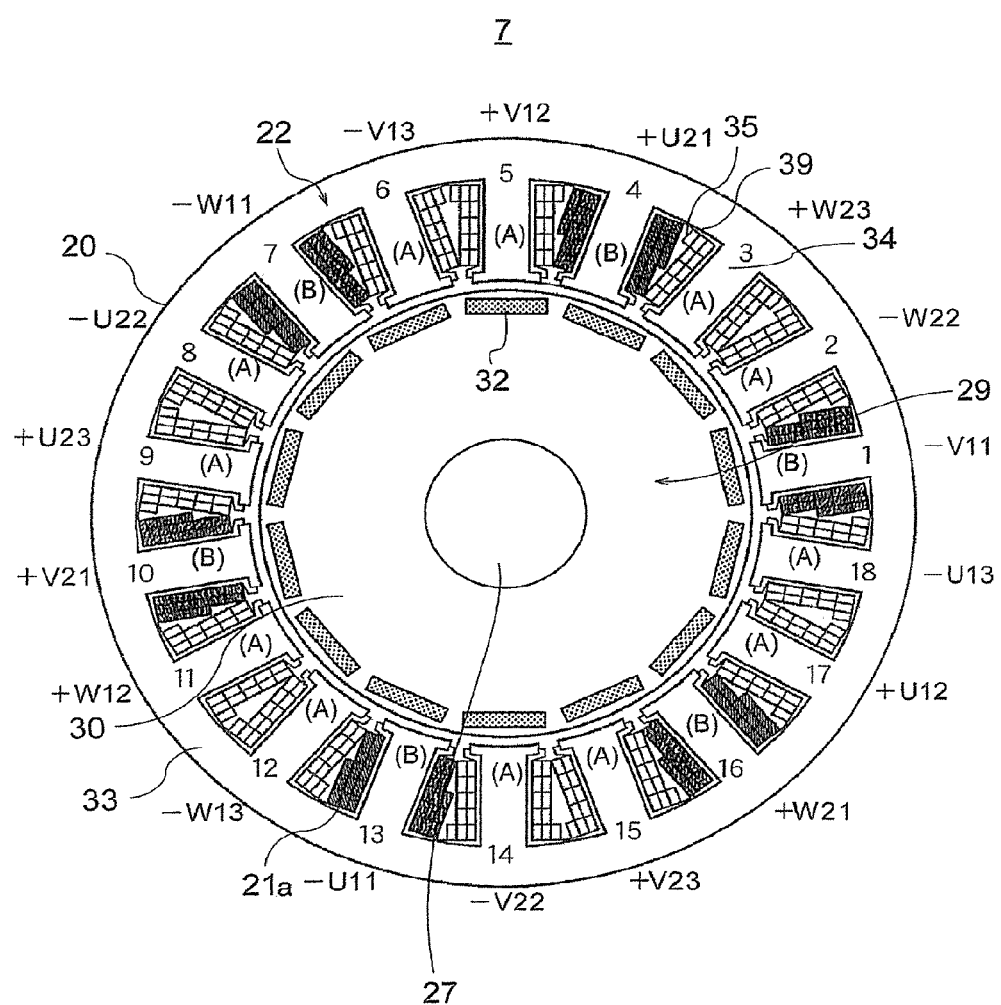
FIG. 40 is a frontal cross section that shows an electric motor according to Embodiment 6.

FIG. 40 is a frontal cross section that shows an electric motor 7 according to Embodiment 6.

In this embodiment, rectangular wire that has a rectangular cross section is used in conducting wires that constitute components of coil portions.

In this figure, the number of turns of conducting wires 21a in coil portions that are mounted to teeth B is greater than the number of turns of conducting wires 21a in coil portions that are mounted to teeth A. In this figure, cross sections of overwound coil portions are hatched.

A remainder of the configuration is similar or identical to that of the electric motor 7 according to Embodiment 1 that is shown in FIG. 3.

In this embodiment, by using the rectangular conducting wires 21a, gaps in the slots 35 are reduced compared to coil portions that use round conducting wire 21, enabling space factor to be improved.

Since a configuration that has different numbers of turns can be achieved in a similar or identical manner to the round wire, as shown in this figure, additional improvements in space factor in the slots 35 can be achieved in addition to the effects that have been mentioned so far.

Figure 41:
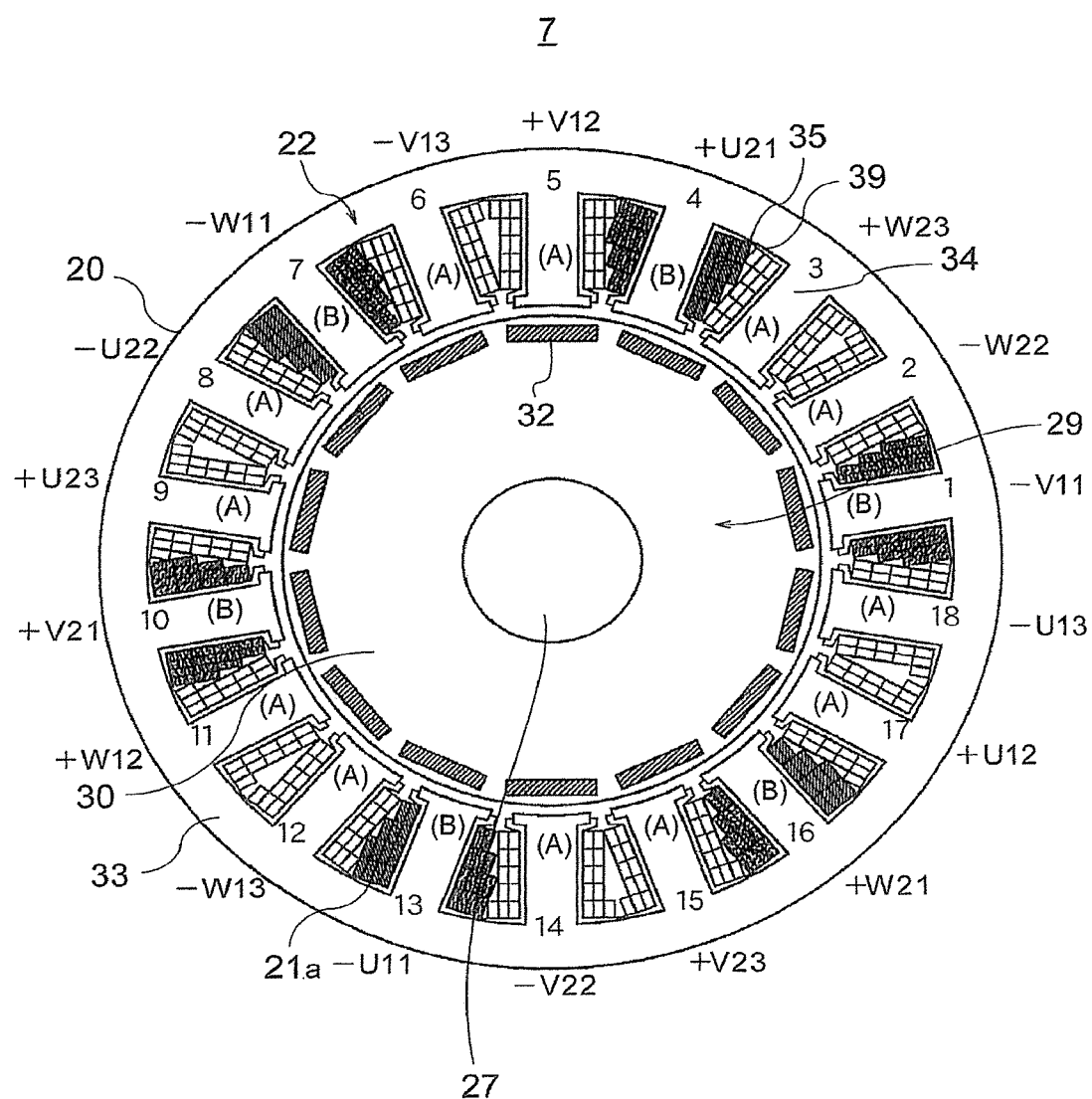
FIG. 41 is a frontal cross section that shows a variation of the electric motor according to Embodiment 6.

Furthermore, FIG. 41 is a variation of Embodiment 6, the number of turns and cross-sectional area of conducting wires 21a in coil portions that are mounted to teeth B being greater than in a remainder of the coil portions.

In this variation, having different cross-sectional areas corresponds to having different wire diameters in the round wire.

Consequently, by making the cross-sectional areas of the rectangular wires different, space factor in the slots 35 can be further improved in a similar manner to making the wire diameters different in the electric motor 7 according to Embodiment 1.

Embodiment 7

Figure 42:
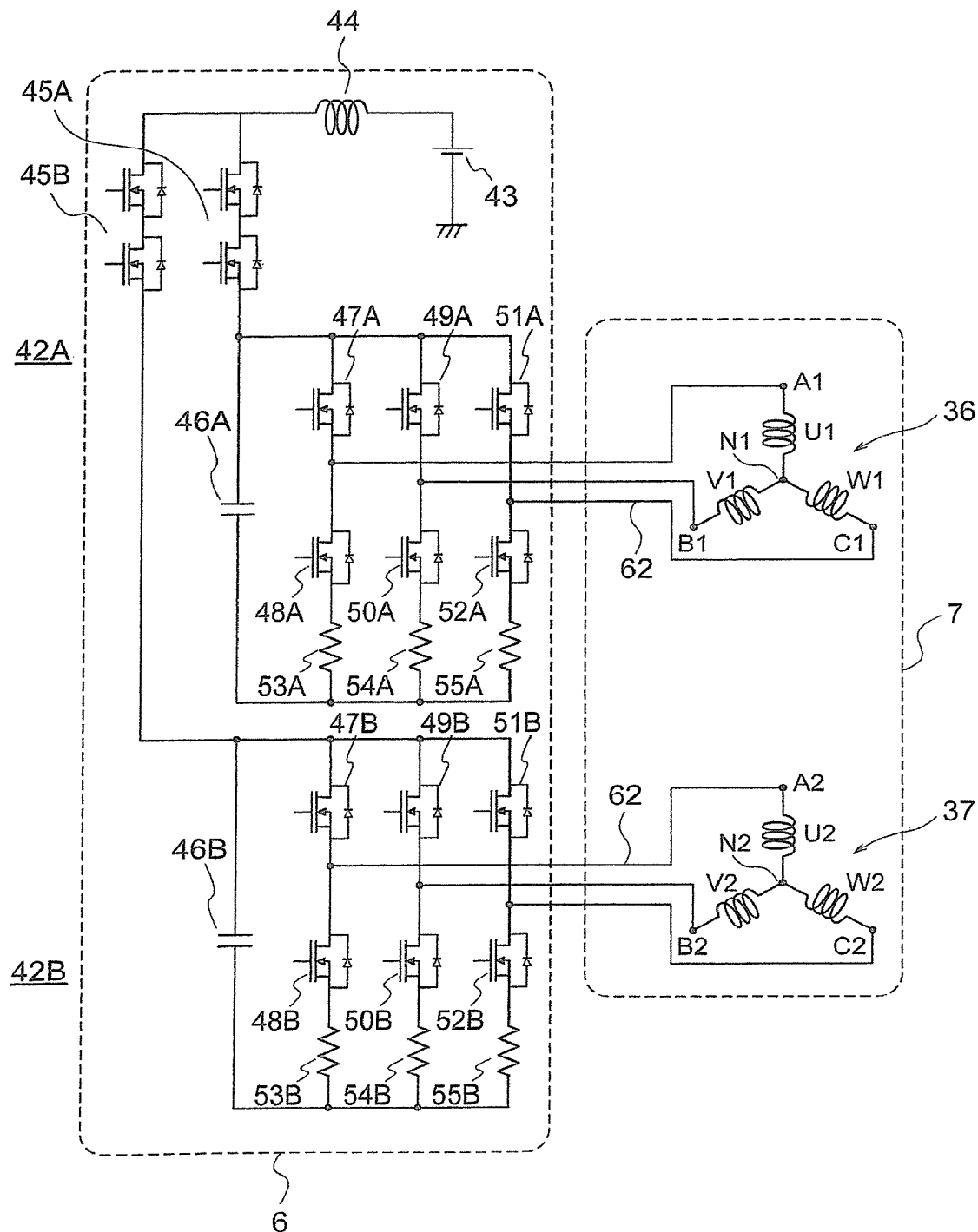
FIG. 42 is a circuit diagram for an electric motor and an ECU according to Embodiment 7.

FIG. 42 is a circuit diagram for an electric motor 7 and an ECU 6 according to Embodiment 7.

In this embodiment, two inverters 42 drive the electric motor 7, a first inverter 42A being connected to the connecting portions A1, B1, and C1 of the first armature winding portion 36 of the armature winding 38 in FIG. 3, and a second inverter 42B being connected to the connecting portions A2, B2, and C2 of the second armature winding portion 37.

For simplicity, only the armature winding is shown in the electric motor 7 in FIG. 42.

This electric motor winding is constituted by: a first armature winding portion 36 that is constituted by a first U-phase winding portion U1, a first V-phase winding portion V1, and a first W-phase winding portion W1; and a second armature winding portion 37 that is constituted by a second U-phase winding portion U2, a second V-phase winding portion V2, and a second W-phase winding portion W2.

Details of the ECU 6 are also omitted for simplicity, and only the power circuit portions of the first inverter 42A and the second inverter 42B are shown.

The ECU 6 is constituted by circuits of the two inverters 42A and 42B, and three-phase electric current is supplied to the first and second armature winding portions 36 and 37 respectively from these inverters 42A and 42B.

A direct-current power source is supplied to the ECU 6 from a power source 43 such as a battery, an electric power supply relay 45A being connected so as to have a noise reduction coil 44 interposed.

Moreover, in FIG. 42, the power source 43 is depicted as if it were inside the ECU 6, but in fact electric power is supplied from an external power source such as a battery through a connector.

There are two electric power supply relays 45A and 45B that are each constituted by two MOSFETs, and the electric power supply relays 45A and 45B open during failure, to prevent excessive electric current from flowing.

Moreover, in the figure, the electric power supply relays 45A and 45B are connected after the power supply 43 and the coil 44, but it goes without saying that the electric power supply relays 45A and 45B may be disposed at a position that is closer to the power supply 43 than the coil 44.

Moreover, a first capacitor 46A and a second capacitor 46B are smoothing capacitors.

In the figure, these are each constituted by a single capacitor, but it goes without saying that they may be configured by connecting a plurality of capacitors in parallel.

The first inverter 42A is constituted by a bridge that uses six MOSFETs. Specifically, in the first inverter 42A, a first MOSFET 47A and a second MOSFET 48A are connected in series, a third MOSFET 49A and a fourth MOSFET 50A are connected in series, a fifth MOSFET 51A and a sixth MOSFET 52A are connected in series, and these three sets of MOSFETs are further connected in parallel. In addition, shunt resistors are respectively connected singly to a ground (GND) side of each of the three lower MOSFETs, i.e., the second MOSFET 48A, the fourth MOSFET 50A, and the sixth MOSFET 52A, and these are the shunts 53A, 54A, and 55A. These shunt resistors are used to detect electric current value. Moreover, an example is shown in which there are three shunts 53A, 54A, and 55A, but since electric current detection is possible even if there are two shunts or even if there is a single shunt, it goes without saying that such configurations are also possible.

Supply of electric current to the electric motor 7 is such that electric current is respectively supplied from between the first MOSFET 47A and the second MOSFET 48A through a busbar 62, etc., to a first U-phase winding portion U1 of the electric motor 7, from between the third MOSFET 49A and the fourth MOSFET 50A through a busbar 62, etc., to a first V-phase winding portion V1 of the electric motor 7, and from between the fifth MOSFET 51A and the sixth MOSFET 52A through a busbar 62, etc., to a first W-phase winding portion W1 of the electric motor 7.

The second inverter 42B is also constituted by a bridge that uses six MOSFETs, in a similar manner to the first inverter 42A. Specifically, in the second inverter 42B, a first MOSFET 47B and a second MOSFET 48B are connected in series, a third MOSFET 49B and a fourth MOSFET 50B are connected in series, a fifth MOSFET 51B and a sixth MOSFET 52B are connected in series, and these three sets of MOSFETs are further connected in parallel. In addition, shunt resistors are respectively connected singly to a ground (GND) side of each of the three lower MOSFETs, i.e., the second MOSFET 48B, the fourth MOSFET 50B, and the sixth MOSFET 52B, and these are the shunts 53B, 54B, and 55B. These shunt resistors are used to detect electric current value. Moreover, an example is shown in which there are three shunts 53B, 54B, and 55B, but since electric current detection is possible even if there are two shunts or even if there is a single shunt, it goes without saying that such configurations are also possible.

Supply of electric current to the electric motor 7 is such that electric current is respectively supplied from between the first MOSFET 47B and the second MOSFET 48B through a busbar 62, etc., to a second U-phase winding portion U2 of the electric motor 7, from between the third MOSFET 49B and the fourth MOSFET 50B through a busbar 62, etc., to a second V-phase winding portion V2 of the electric motor 7, and from between the fifth MOSFET 51B and the sixth MOSFET 52B through a busbar 62, etc., to a second W-phase winding portion W2 of the electric motor 7.

The two inverters 42A and 42B are switched by sending signals from the controlling circuit (not shown) to each of the above MOSFETs that correspond to the angle of rotation that is detected by the magnetic sensor 14 that constitutes the rotational angle sensor, to supply the desired three-phase electric currents to the first armature winding portion 36 and the second armature winding portion 37.

Moreover, the angle of rotation of the shaft 27 may be detected using a resolver or a giant magnetoresistive (GMR) sensor instead of the magnetic sensor 14.

When driven by the two inverters 42A and 42B in this manner, torque ripples can be significantly reduced by changing the phases of the electric currents that the two inverters 42A and 42B supply. By offsetting the phases of the electric currents of the two inverters 42A and 42B by 30 electrical degrees, mutual electrical angular phase sixth-order torque ripples are canceled out, achieving an effect that reduces P-P values of torque ripples significantly.

In an electric power steering apparatus 1, torque ripples not only cause vibration and noise, the driver may also feel the torque ripples, which degrades the steering feel.

However, since torque ripples can be reduced significantly using the configuration according to this embodiment, reducing vibration noise, one effect is that a superior steering feel can be achieved.

In addition, since the first armature winding portion 36 and the second armature winding portion 37, which are each constituted by three phases, are connected to different inverters 42A and 42B, even in the event of failure of one of the inverters 42A and 42B or a wire breakage in the connections of one, etc., since three-phase input from the other can continue, one effect is that redundancy that continues driving the electric motor 7 is achieved.

By using two inverters 42A and 42B, since the electric current that the inverters 42A and 42B supply can be reduced to half that of the case of one inverter 42, loss in the circuits is reduced, and one effect is that the amount of heat generated is reduced.

Moreover, since the effects according to this embodiment can be combined with the configurations of the electric motor in each of the above embodiments, in addition to the effects that have been mentioned in each of the above embodiments, effects such as reductions in the amount of heat generated, reductions in torque ripples, and imparting redundancy can be added.

Moreover, in each of the above embodiments, an electric motor that has a three-phase armature winding as a rotary electric machine has been explained, but this is one example, and the electric motor may have a multiphase armature winding other than a three-phase one.

An electric motor that is mounted to an electric power steering apparatus is one example, and it may be an electric motor that is used for machining, conveyance, etc.

The present invention can also be applied to generators.

The invention claimed is:

1. A rotary electric machine comprising:
a stator including
a stator core in which a plurality of slots are formed by a plurality of teeth that extend radially inward from an annular core back so as to leave a spacing in a circumferential direction, and
an armature winding that comprises a plurality of coil portions that are mounted to said teeth of said stator core; and
a rotor that is disposed inside said stator so as to have a magnetic air gap portion interposed, and that rotates around a rotating shaft, wherein
the number of identical-phase coil portions among said coil portions in said armature winding is n, where n≥3, and in a series coil portion group that includes m of said coil portions that are serially connected, where m≤n, where a largest electrical angular phase difference between two of said coil portions in said series coil portion group is $\theta_m$, an electrical angular phase difference of a first of said coil portions in said series coil portion group is $\theta_1=0°$, and respective electrical angular phase differences of remaining coil portions relative to said coil portion that has an electrical angular phase difference of $\theta_1$ are $\theta_2$, $\theta_3$, etc., through $\theta_m$ in increasing order, and
the numbers of turns of conducting wire in said coil portions that have an electrical angular phase difference of $\theta_k$ that satisfies $\theta_1<\theta_k<\theta_m$, where k=2, 3, etc., through m−1, are greater than the numbers of turns of conducting wire in said coil portions that have electrical angular phase differences of $\theta_1$ and $\theta_m$, and are also greater than the numbers of turns of conducting wire in said coil portions that are adjacent to said coil portions that have said electrical angular phase differences of $\theta_k$ on two sides in a circumferential direction of said stator core, and phases of said coil portions that have said electrical angular phase differences of $\theta_k$ are also different than phases of each of said coil portions that are adjacent to said coil portions that have said electrical angular phase differences of $\theta_k$ on said two sides in said circumferential direction.

2. The rotary electric machine according to claim 1, wherein a wire diameter of said coil portions that have said electrical angular phase differences of $\theta_k$ is different than a wire diameter of other coil portions in the same series coil portion group.

3. The rotary electric machine according to claim 1, wherein an arrangement of phases and numbers of turns in each of said coil portions is rotationally symmetrical in mechanical angle for L iterations around a center of said rotating shaft, where L is a natural number that is greater than or equal to 2.

4. The rotary electric machine according to claim 3, wherein said series coil portion groups constitute a parallel circuit, the number of parallel arms in said parallel circuit being L.

5. The rotary electric machine according to claim 1, wherein a width in said circumferential direction of said teeth to which said coil portions that have said electrical angular phase differences of $\theta_k$ are mounted is greater than a width in said circumferential direction of other teeth.

6. The rotary electric machine according to claim 1, wherein a width in a circumferential direction of said slots in which said coil portions that have said electrical angular phase differences of $\theta_k$ are housed is greater than a width in said circumferential direction of other slots.

7. The rotary electric machine according to claim 1, comprising (18±4)y poles and 18y slots, where y is a natural number.

8. The rotary electric machine according to claim 1, wherein said series coil portion groups constitute a parallel circuit, wire diameters of said coil portions that have identical electrical angular phase differences being equal in each of said series coil portion groups.

9. The rotary electric machine according to claim 7, wherein among m of said coil portions that constitute said series coil portion group, where m≤n, a turn ratio is greater than 1.0 and less than or equal to 2.0, where said turn ratio is defined as a ratio that is found using the number of turns in said coil portions that have said electrical angular phase differences of $\theta_k$ as a numerator and the number of turns in remaining coil portions as a denominator.

10. The rotary electric machine according to claim 1, wherein tip portions of said teeth of said stator core near said rotor are linked to tip portions of neighboring teeth on two sides in said circumferential direction.

11. The rotary electric machine according to claim 1, wherein:
said rotary electric machine is an electric motor; and
said armature winding comprises a first armature winding portion and a second armature winding portion, said first armature winding portion and said second armature winding portion being respectively connected to separate inverters.

12. The rotary electric machine according to claim 11, wherein said electric motor is mounted to an electric power steering apparatus.

13. A rotary electric machine comprising:
a stator including
a stator core in which a plurality of slots are formed by a plurality of teeth that extend radially inward from an annular core back so as to leave a spacing in a circumferential direction, and
an armature winding that comprises a plurality of coil portions that are mounted to said teeth of said stator core; and
a rotor that is disposed inside said stator so as to have a magnetic air gap portion interposed, and that rotates around a rotating shaft, wherein
the number of identical-phase coil portions among said coil portions in said armature winding is n, where n≥3, and in a series coil portion group that includes m of said coil portions that are serially connected, where m≤n, where a largest electrical angular phase difference between two of said coil portions in said series coil portion group is $\theta_m$, an electrical angular phase difference of a first of said coil portions in said series coil portion group is $\theta_1=0°$, and respective electrical angular phase differences of remaining coil portions relative to said coil portion that has an electrical angular phase difference of $\theta_1$ are $\theta_2$, $\theta_3$, etc., through $\theta_m$ in increasing order, and
wire diameters of conducting wire in said coil portions that have said electrical angular phase difference of $\theta_k$ that satisfies $\theta_1<\theta_k<\theta_m$, where k=2, 3, etc., through m−1, are larger than wire diameters of conducting wire in said coil portions that have electrical angular phase differences of $\theta_1$ and $\theta_m$, and are also larger than wire diameters of conducting wire in said coil portions that are adjacent to said coil portions that have said electrical angular phase differences of $\theta_k$ on two sides in a circumferential direction of said stator core, and phases of said coil portions that have said electrical angular phase differences of $\theta_k$ are also different than phases of each of said coil portions that are adjacent to said coil portions that have said electrical angular phase differences of $\theta_k$ on said two sides in said circumferential direction.

* * * * *